US012615147B2

(12) United States Patent
Raju et al.

(10) Patent No.: US 12,615,147 B2
(45) Date of Patent: Apr. 28, 2026

(54) SYSTEMS AND METHODS TO REPLICATE PRIVATE KEY SHARES FROM MULTI-PARTY COMPUTATION (MPC) NODES IN A PRIMARY SUBSYSTEM TO MPC NODES A BACKUP SUBSYSTEM

(71) Applicant: Nasdaq, Inc., New York, NY (US)

(72) Inventors: Shankar Raju, Harrison, NJ (US); Jiayue Chen, Austin, TX (US)

(73) Assignee: Nasdaq, Inc., New York, NY (US)

( * ) Notice: Subject to any disclaimer, the term of this patent is extended or adjusted under 35 U.S.C. 154(b) by 260 days.

(21) Appl. No.: 18/232,858

(22) Filed: Aug. 11, 2023

(65) Prior Publication Data

US 2025/0055684 A1 Feb. 13, 2025

(51) Int. Cl.
H04L 9/08 (2006.01)
H04L 9/00 (2022.01)
H04L 9/32 (2006.01)

(52) U.S. Cl.
CPC .......... H04L 9/0894 (2013.01); H04L 9/0825 (2013.01); H04L 9/3247 (2013.01); H04L 9/50 (2022.05)

(58) Field of Classification Search
CPC ....... H04L 9/0894; H04L 9/50; H04L 9/0825; H04L 9/3247
(Continued)

(56) References Cited

U.S. PATENT DOCUMENTS

2020/0044863 A1 2/2020 Yadlin
2021/0391983 A1 12/2021 Will
(Continued)

OTHER PUBLICATIONS

U.S. Appl. No. 18/232,857, filed Aug. 11, 2023, Chen et al.
(Continued)

*Primary Examiner* — Linglan Edwards
*Assistant Examiner* — Phuc Pham
(74) *Attorney, Agent, or Firm* — NIXON & VANDERHYE P.C.

(57) ABSTRACT

A system includes a primary asset custody subsystem in a first cloud computing data center and a backup asset custody subsystem in a second cloud computing data center different from the first cloud computing data center. The primary subsystem includes a plurality of primary multi-party computation (MPC) clusters, where each primary MPC cluster is allocated to an asset owner and includes a primary MPC client and a plurality of primary MPC nodes. The backup subsystem includes a plurality of backup MPC clusters corresponding to the plurality of primary MPC clusters, where each backup MPC cluster is allocated to the asset owner of its corresponding primary MPC cluster and includes a backup MPC client and a plurality of backup MPC nodes. The backup MPC client sends an export public key from each backup MPC node to the primary MPC client, where each export public key is part of a corresponding export public key-export private key pair. The primary MPC client sends each export public key to a corresponding primary MPC node, and in response, receives from each primary MPC node a corresponding encrypted private key share encrypted with a corresponding export public key. The primary MPC client then sends the encrypted private key shares to the backup MPC client, which transmits the encrypted private key shares to corresponding backup MPC nodes. Each backup MPC node decrypts a corresponding encrypted private key share using the export private key from the corresponding export public key-export private key pair to obtain a corresponding backup private key share which can be used if the backup subsystem takes over operation, and to store the decrypted corresponding backup private key share.

20 Claims, 5 Drawing Sheets

(58) Field of Classification Search
USPC ........................................................ 713/171
See application file for complete search history.

(56) References Cited

U.S. PATENT DOCUMENTS

| | | | | |
|---|---|---|---|---|
| 2022/0094555 A1 | 3/2022 | Roy | | |
| 2022/0255764 A1 | 8/2022 | Li | | |
| 2022/0261697 A1* | 8/2022 | Chopra | ................... | H04L 9/008 |
| 2022/0303122 A1 | 9/2022 | Be'Ery | | |
| 2023/0078704 A1* | 3/2023 | Sun | ......................... | H04L 9/088 |
| | | | | 713/171 |
| 2023/0177496 A1 | 6/2023 | Le Van Gong | | |
| 2024/0249289 A1 | 7/2024 | Chiapuzio | | |
| 2024/0372697 A1* | 11/2024 | Kobel | ..................... | H04L 9/085 |
| 2025/0211429 A1* | 6/2025 | Wang | ..................... | H04L 9/085 |

OTHER PUBLICATIONS

Notice of Allowance dated Jun. 10, 2025 for U.S. Appl. No. 18/232,857, 14 pages.
U.S. Appl. No. 19/352,522, filed Oct. 8, 2025, Chen et al.

* cited by examiner

SYSTEMS AND METHODS TO REPLICATE PRIVATE KEY SHARES FROM MULTI-PARTY COMPUTATION (MPC) NODES IN A PRIMARY SUBSYSTEM TO MPC NODES A BACKUP SUBSYSTEM

CROSS REFERENCE(S) TO RELATED APPLICATION(S)

The subject matter of commonly-assigned U.S. application, Ser. No. 18/232,857, filed on Aug. 11, 2023, now U.S. Pat. No. 12,445,274, entitled "Systems and Methods to Dynamically Provision Multi-Party Computation (MPC) Nodes," claiming priority from U.S. provisional application No. 63/470,235, filed on Jun. 1, 2023, is incorporated herein by reference. This application is referred to hereafter as the "Related Application."

TECHNICAL OVERVIEW

The subject matter described herein relates to cryptography, information security, distributed systems, cloud computing, and blockchain technology.

BACKGROUND

Information systems often involve many computing devices and large amounts of (and/or important) data. One technical challenge faced in the design of information systems is data resiliency; i.e., how to ensure that data used in the system is available despite disruptions.

SUMMARY

In example embodiments, a system comprises one or more hardware processors and one or more memories in communication with the one or more hardware processors. They are configured to implement a primary asset custody subsystem in a first cloud computing data center and a backup asset custody subsystem in a second cloud computing data center different from the first cloud computing data center. The primary asset custody subsystem includes a plurality of primary multi-party computation (MPC) clusters. Each primary MPC cluster is allocated to an asset owner and includes a primary MPC client and a plurality of primary MPC nodes. Each primary MPC node in the primary MPC cluster is configured to operate in a different computing environment. The backup asset custody subsystem includes a plurality of backup MPC clusters corresponding to the plurality of primary MPC clusters. Each backup MPC cluster is allocated to the asset owner of its corresponding primary MPC cluster and includes a backup MPC client and a plurality of backup MPC nodes. Each backup MPC node in the backup MPC cluster is configured to operate in a different computing environment. Each primary MPC node in the primary MPC cluster is configured to generate a private key share for a partial signature for a blockchain transaction. The backup MPC client is configured to send an export public key from each of the backup MPC nodes in the backup MPC cluster to the primary MPC client. Each export public key is part of a corresponding export public key-export private key pair. The primary MPC client is configured to: send each of the export public keys to a corresponding primary MPC node in the primary MPC cluster, and in response, receive from each primary MPC node in the primary MPC cluster a corresponding encrypted private key share encrypted with a corresponding export public key; and send the encrypted private key shares to the backup MPC client. The backup MPC client is configured to transmit the encrypted private key shares to corresponding backup MPC nodes in the backup MPC cluster. Each backup MPC node in the backup MPC cluster is configured to decrypt a corresponding encrypted private key share using the export private key from the corresponding export public key-export private key pair to obtain a corresponding backup private key share, and to store the decrypted corresponding backup private key share.

In certain example embodiments, each backup MPC node in the backup MPC cluster may be configured to encrypt its corresponding backup private key share using an encryption protocol associated with the backup MPC node and to store the encrypted backup private key share in memory.

In certain example embodiments, in response to the backup asset custody subsystem being activated for operation, the backup MPC client in the backup MPC cluster is configured to generate a full signature for a blockchain transaction for an asset owner associated with the backup MPC cluster using backup partial signatures generated using the backup private key shares from each backup MPC node in the backup MPC cluster.

In certain example embodiments, each backup MPC node in the backup MPC cluster may be configured to generate a new backup private key share different from and to replace its corresponding backup private key share. Each backup MPC node in the backup MPC cluster may be configured to encrypt the new backup private key share the new backup private key share in a database for the backup MPC node, and to store the decrypted corresponding backup private key share. In response to the backup asset custody subsystem being activated for operation, the backup MPC client in the backup MPC cluster may be configured to generate a full signature for a blockchain transaction for an asset owner associated with the backup MPC cluster using backup partial signatures generated using the new backup private key shares from each backup MPC node in the backup MPC cluster.

In certain example embodiments, each primary MPC node in the primary MPC cluster may be configured to generate and store in a database for the primary MPC node a new primary private key share different from and to replace its corresponding private key share. The new primary private key share is different from the new backup private key share for the corresponding backup MPC node. Each primary MPC node in the primary MPC cluster may be configured to encrypt the new primary private key share and store the encrypted new primary private key share in a database for the primary MPC node. The primary MPC client may be configured to generate a full signature for a blockchain transaction for an asset owner associated with the primary MPC cluster using primary partial signatures generated using the new primary private key shares from each primary MPC node in the primary MPC cluster.

In certain example embodiments, the primary MPC client is configured to communicate with each primary MPC node in the primary MPC cluster, using one or more MPC protocols, to generate a public blockchain address for an asset owner associated with the primary MPC cluster. Similarly, the backup MPC client is configured to communicate with each backup MPC node in the backup MPC cluster, using one or more MPC protocols, to generate a public blockchain address for an asset owner associated with the backup MPC cluster.

In certain example embodiments, the backup MPC client is configured to request the export public key from each backup MPC node in the backup MPC cluster, and in response, each backup MPC node is configured to generate its export public key from the export private key in the corresponding export public key-export private key pair and send the export public key to the backup MPC client.

In certain example embodiments, the first cloud computing data center is located in a first geographic location that is remote and different from a second geographic location where the second cloud computing data center is located. Each of the primary MPC client and the backup MPC client is each configured to establish a secure communications link permitting secure communications between the primary asset custody subsystem in the first cloud computing data center and the backup asset custody subsystem in the second cloud computing data center. The secure communications link may be a virtual private cloud (VPC) peering connection configured to securely route data packets between the primary MPC client and the backup MPC client using private IP addresses. After the VPC peering connection is configured, the primary MPC client and the backup MPC client may perform a mutual authentication process, e.g., such as a mutual transport layer security (MTLS) process. Each backup MPC cluster may be configured with virtual private communication links between the different computing environments associated with each backup MPC node in the backup MPC cluster.

In certain example embodiments, the system may include an additional backup asset custody subsystem in a third cloud computing data center different from the first and second cloud computing data centers.

In example embodiments, a method for the computing system described in one or more of the example embodiments comprises operating each primary MPC node in the primary MPC cluster in a different computing environment and generating a private key share for a partial signature for a blockchain transaction and operating each backup MPC node in the backup MPC cluster operate in a different computing environment. The backup MPC client sends an export public key from each backup MPC node in the backup MPC cluster to the primary MPC client, where each export public key is part of a corresponding export public key-export private key pair. The primary MPC client sends each export public key to a corresponding primary MPC node in the primary MPC cluster, and in response, receives from each primary MPC node in the primary MPC cluster a corresponding encrypted private key share encrypted with a corresponding export public key, and sends the encrypted private key shares to the backup MPC client. The backup MPC client transmits the encrypted private key shares to corresponding backup MPC nodes in the backup MPC cluster. Each backup MPC node in the backup MPC cluster decrypts a corresponding encrypted private key share using the export private key from the corresponding export public key-export private key pair to obtain a corresponding backup private key share, and to store the decrypted corresponding backup private key share.

In example embodiments, a non-transitory, computer-readable storage medium includes instructions stored thereon for the computing system described in one or more of the example embodiments, such that execution of the instructions by the one or more hardware processors causes the one or more hardware processors to perform operations comprising: operating each primary MPC node in the primary MPC cluster in a different computing environment and generating a private key share for a partial signature for a blockchain transaction and operating each backup MPC node in the backup MPC cluster operate in a different computing environment. The backup MPC client sends an export public key from each backup MPC node in the backup MPC cluster to the primary MPC client, where each export public key is part of a corresponding export public key-export private key pair. The primary MPC client sends each export public key to a corresponding primary MPC node in the primary MPC cluster, and in response, receives from each primary MPC node in the primary MPC cluster a corresponding encrypted private key share encrypted with a corresponding export public key, and sends the encrypted private key shares to the backup MPC client. The backup MPC client transmits the encrypted private key shares to corresponding backup MPC nodes in the backup MPC cluster. Each backup MPC node in the backup MPC cluster decrypts a corresponding encrypted private key share using the export private key from the corresponding export public key-export private key pair to obtain a corresponding backup private key share, and to store the decrypted corresponding backup private key share.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1:
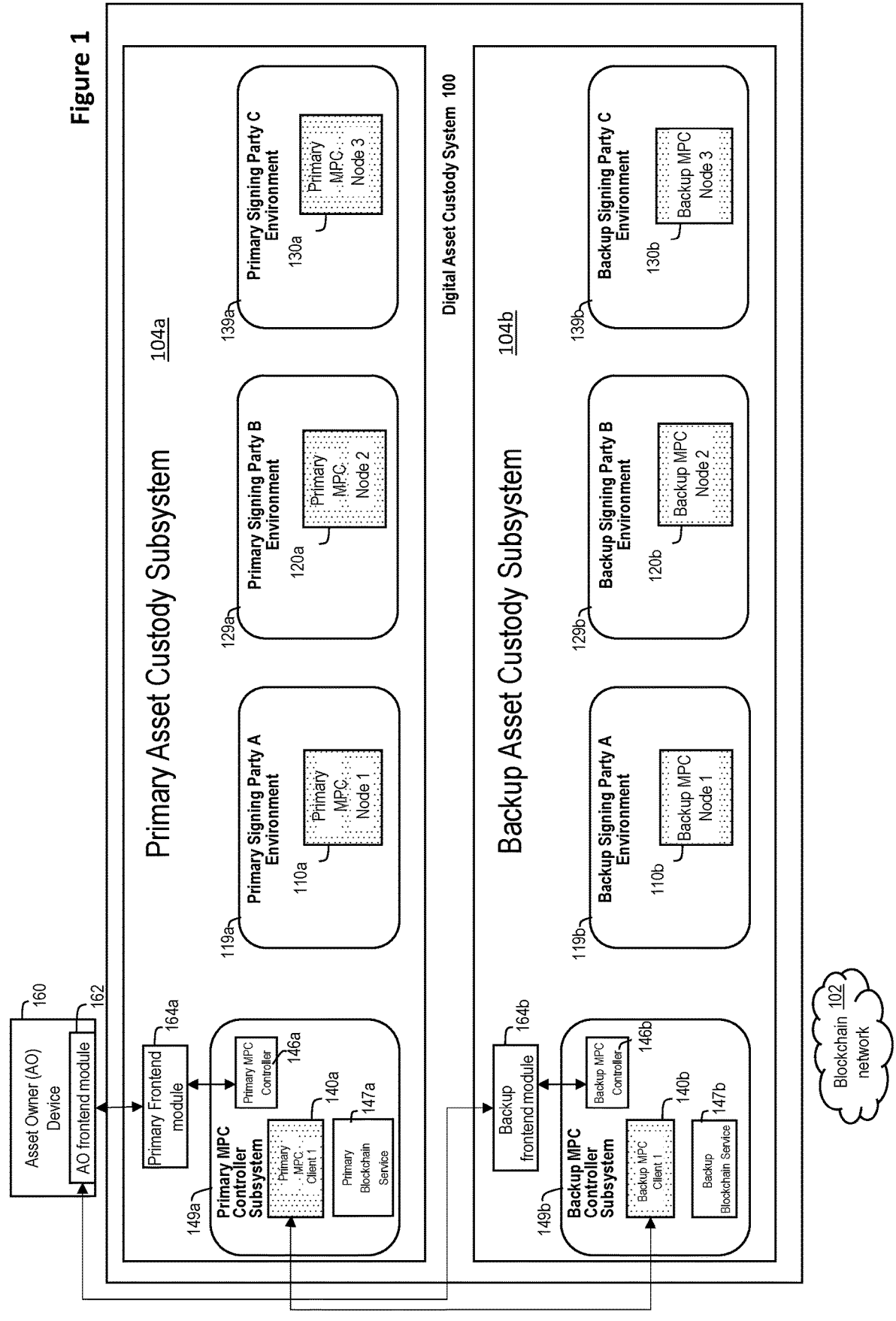
FIG. 1 is an example digital asset custody system diagram that includes a primary asset custody subsystem and a backup asset custody subsystem according to certain example embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely to orient the reader as to the general subject matter of each section; as will be seen below, the description of many features spans multiple sections, and headings should not be read as affecting the meaning of the description included in any section.

1. Information Regarding Blockchain, Multiparty Computation (MPC), Cloud Computing, and Related Technology Embodiments described herein relate to blockchain technology, cryptography, multi-party computation (MPC), and cloud computing. Information related to some terms and concepts in these technical fields will now be provided.

Blockchain technology (which may also be referred to as "distributed ledger technology," or simply "blockchain") is a relatively new type of database technology. An example implementation and corresponding blockchain techniques are described in a 2004 article by Satoshi Nakamoto titled "Bitcoin: A Peer-to-Peer Electronic Cash System," the entire contents of which are hereby incorporated by reference. Blockchains have many uses such as, but not limited to recording exchanges of goods (virtual or physical), securely recording data, cryptocurrency (such as Bitcoin), implementing smart contracts that include functionality to be executed when certain conditions are met and recorded on a blockchain, etc.

A blockchain is a distributed database system (sometimes called a distributed ledger) that records transactions. A transaction (which may also be called a "blockchain transaction" or a "distributed ledger transaction") is a data structure that contains different fields. In many systems, this data structure can express, inter alia, a transfer of some amount of cryptocurrency from a source address (also referred to as a "public source address") to a destination address (also referred to as a "public destination address," or similar).

In many blockchain systems, multiple transactions are collected and formed into a block, and each successive block of transactions cryptographically depends on a prior block. This architecture creates a chain of blocks-a blockchain. The cryptographic dependency can be generated by including a fingerprint (such as a cryptographic hash) into a block that is based on data from a prior block. Each block then ends up being cryptographically linked to a prior block such that modification of a prior block will be mathematically evident. Transactions can be secured and authenticated within a blockchain system (such as Bitcoin and other systems) by using digital signatures (details below).

A "wallet" (or "digital wallet," or similar) may perform functionality that allows a user to interface with a blockchain system; this functionality may include storing private keys (and/or related information, such as recovery seeds), managing digital assets, communicating data to/from a blockchain system, and/or generating transactions (including the signing of the transactions) for recordation in a blockchain system. As used herein, the term "digital asset" refers to an asset that is issued and/or transferred using distributed ledger technology, blockchain technology, and/or or similar technology; examples of digital assets include cryptocurrencies and non-fungible tokens (NFTs). Depending on the context, the term "wallet" may refer to a data structure, a physical device, an application (or other software component), or a service. As one example, "wallet" may refer to an application that a user may use on their mobile device to create, e.g., a public Ethereum address for the user (along with the associated private key) and to receive and send Ethereum. As another example, "wallet" may refer to a hardware device that a user may plug into the user's computer when the user needs it, and which is configured to securely store information (such as private keys and/or recovery seeds) for the user. As another example, "wallet" may refer to a component in a larger system that performs functionality such as generating public addresses (also referred to as "blockchain public addresses" or similar) for use on a blockchain system and interfacing with that blockchain system.

In many implementations, a wallet (whether it is a data structure, a physical device, an application, a service, or some other implementation) creates a private key for the user of the wallet. From this private key, the wallet derives a public blockchain address. When the user wants the wallet to "hold" some digital assets, the user directs some digital asset(s) to be sent to the public blockchain address in one or more blockchain transactions. Subsequently, to transfer assets away from the public blockchain address, one more blockchain transactions that specify the outbound transfer must be processed by the blockchain network; for such blockchain transactions to be valid (and actually processed by the network), they must be signed with a digital signature that is based on the private key (details below); thus, control of the private key amounts to control of the assets at the associated public address.

For clarity, while many wallets involve the storage of private keys, in some systems private key shares rather than private keys are used for the signing of transactions (details provided below), in which case a "wallet" might provide some of the functionality noted above but not involve the storage of private keys.

A digital signature involves a set of algorithms and encryption protocols that can be used to verify the authenticity or ownership of a digital message (such a message involving a transaction in a blockchain system). In the case of transactions in the example of Bitcoin, a digital signature in some implementations is generated by taking a hash of the transaction (i.e., the transaction data structure) and then encrypting the resulting message hash with a private key. This process generates an encrypted message hash, also known as a digital signature. In many types of blockchain implementations (such as Bitcoin), a transaction must have a valid signature (e.g., must have the correct mathematical relationship to the public source address for the assets being transferred) for the transaction to be considered valid and included into the blockchain.

As noted above, in some approaches to signing blockchain transactions, a private key is used to generate the digital signature. Another approach involves the use of multi-party computation (MPC), threshold cryptography, and the use of "key shares," instead of a private key, to sign a transaction. ("Key shares" may also be referred to in this document as "private key shares," "cryptographic key shares," or similar.) In MPC, a function can be performed involving multiple parties, where no individual party can see the data that other parties input into the function. Some approaches to using MPC to sign a transaction operate as follows: a number of different parties are involved, with each party separately generating their own respective key share (with the generated respective key shares having a mathematical relationship to the same private key); each party signs the transaction with their respective key share, thereby generating a partial signature; and then the partial signatures are used to generate a full signature (which in some instances may also be referred to as a "threshold signature," to indicate that it is based on partial signatures from a required threshold number of key shares/parties). This approach has the same desired result as signing a transaction with a private key, in that a valid signature is generated/arrived at; however, this approach does not require that a full private key be held or be used in the generation of the signature. Per this approach, for an attacker to sign a transaction, there is so single private key that is available, that the attacker could attempt to obtain; instead, the attacker would need to obtain all of the key shares required to generate a threshold signature; and even if the attacker is able to obtain some of the key shares, if there is even one key share that the attacker cannot obtain, then the attacker cannot produce a valid threshold signature.

The term "secret" is a term from cryptography that refers to data (e.g., a data element or data structure) that is supposed to be accessible only on a limited/restricted basis (e.g., by only a limited number of components/parties) and relates to security. Some examples of a secret are a private key, a private key share, a password, a passphrase, and authentication credentials. A secret may also be referred to herein as "secret data," "secret information," or similar. Data (e.g., a data element or data structure) that is not a secret may be referred to herein as "a non-secret," "non-secret information," "non-secret data," or similar. One example of a non-secret is a public key.

Cloud computing is a technical field that includes a number of aspects. Important virtualization technologies used in cloud computing are virtual machines (VMs), containers, and virtual private cloud (VPC) networks.

A VM is software that provides the functionality of a physical (hardware) computing machine; a VM runs on a physical host computing machine that includes one or more hardware processors in communication with one or more memories that store emulation program code to implement the VM. Each VM typically has its own operating system, and functions separately from other VMs, even if they run on the same physical host computing machine. VMs can run on servers, desktop computers, or embedded platforms which may be proximate to the operation or remote to the operation, such as in a cloud-based service or environment. Multiple VMs can share resources from a physical host computing machine, including CPU cycles, network bandwidth and memory.

A container is a self-contained package of software; in many instances, a container will include the code for a particular application along with the dependencies for that application. A container host is a software system that can run containers. Container hosts can run on many different machines (i.e., hardware computers and VMs); a container can be built using a standardized format, and deployed onto and run by a container host, without regard to the specifics of the machine on which the container host might be running; and so, containers are said to be "portable." When multiple containers run on the same container host, they do so in a manner that is isolated from each other; e.g., they are run in separate processes. It is not required that VMs and containers be used together, though they can be. As described above, a container host can run in a VM; though a container host can also run directly on the operating system of a hardware computer.

A virtual private cloud (VPC) is an on-demand configurable pool of shared computing and storage resources allocated within a public cloud environment, providing a certain level of isolation between different users using the resources. The isolation between one VPC user and all other users of the same cloud (other VPC users as well as other public cloud users) is sometimes achieved by allocating a private internet protocol (IP) subnetwork and a virtual communication construct (such as a VLAN or a set of encrypted communication channels) per user. A VPC may provide isolation within the cloud using a virtual private network (VPN) function that secures with authentication and encryption remote access of a user to its VPC resources. Examples of VPC features implemented by different cloud providers include Amazon Virtual Private Cloud, IBM Cloud Virtual Private Cloud, Google Cloud Platform Virtual Private Cloud, and Microsoft Azure Virtual Network.

One type of information system is a digital asset custody system. Digital asset custody systems are used to secure information (such as private keys, private key shares, and/or other sensitive/valuable data) and to provide and control access to digital assets (such as cryptocurrencies). Once a digital asset custody system is developed and deployed, there is the possibility that one or more events may cause a failure of the digital asset custody system, which could deny asset owners access to their digital assets secured in the digital asset custody system. Thus, some digital asset custody systems are designed to include resiliency features, to facilitate operation despite such events. In some instances, a digital asset custody system is designed to include a "primary" subsystem (which may be referred to as, e.g., a "primary asset custody subsystem" or similar) that handles operations under normal conditions, and a "secondary" or "backup" subsystem (which may be referred to, e.g., as a "backup asset custody subsystem" or similar) that can take over take over the functions of the primary asset custody subsystem in the event of a failure in the primary asset custody subsystem.

There are technical challenges with deploying a backup digital asset custody subsystem, including for example: how to deploy the backup asset custody subsystem so that it can take over operations of the primary asset custody subsystem in the event that the primary asset custody subsystem fails; how to securely transfer secure information such as private key shares from the primary asset custody subsystem to the backup asset custody subsystem; and how to safeguard the secure information after the private key share transfer in case some or all of the private key share transfer may have been intercepted by an unauthorized party.

2. Overview

Described herein is a digital asset custody system that, in some embodiments, securely stores information (such as private key shares and/or other secrets) and uses that information to custody/control access to digital assets such as cryptocurrencies. In various embodiments, the digital asset custody system may implement functionality such as instantiating/deploying MPC clusters, creating digital wallets, and/or generating digital asset transactions (via the use of private key shares). The digital asset custody system may include a primary asset custody subsystem and a backup asset custody subsystem. In general, the primary asset custody subsystem may be used to handle operations for the digital asset custody system (e.g., performing operations such as the generating of digital asset transactions); however, in some circumstances (e.g., if there is an issue in the primary asset custody system, and/or for other reasons), the digital asset custody system may switch over to the backup asset custody subsystem, such that the backup asset custody subsystem is then used to handle operations for the digital asset custody system. Whenever the primary asset custody subsystem generates a new digital wallet for the custody of digital assets, the generation of the wallet may involve the creation of private key shares. After creation, the private key shares may be replicated to the backup asset custody subsystem using a "private key share replication process" (as described herein). Additionally, after (and/or in connection with) the private key share replication process, the private key shares may be regenerated, both in the primary subsystem and backup subsystem, using a "private key share re-generation process" (as described herein). Upon completion of the private key share re-generation process, the newly-generated key shares stored in the primary subsystem may be different from the newly-generated key shares stored in the backup subsystem, though both sets of key shares may be used to sign the same digital asset transactions. Via the private key share replication process (and re-generation process if used), the backup asset custody subsystem obtains the data that it needs to generate digital asset transactions (i.e., valid private key shares) and thus can perform operations for the digital asset custody system when it is switched over to.

Figure 2:
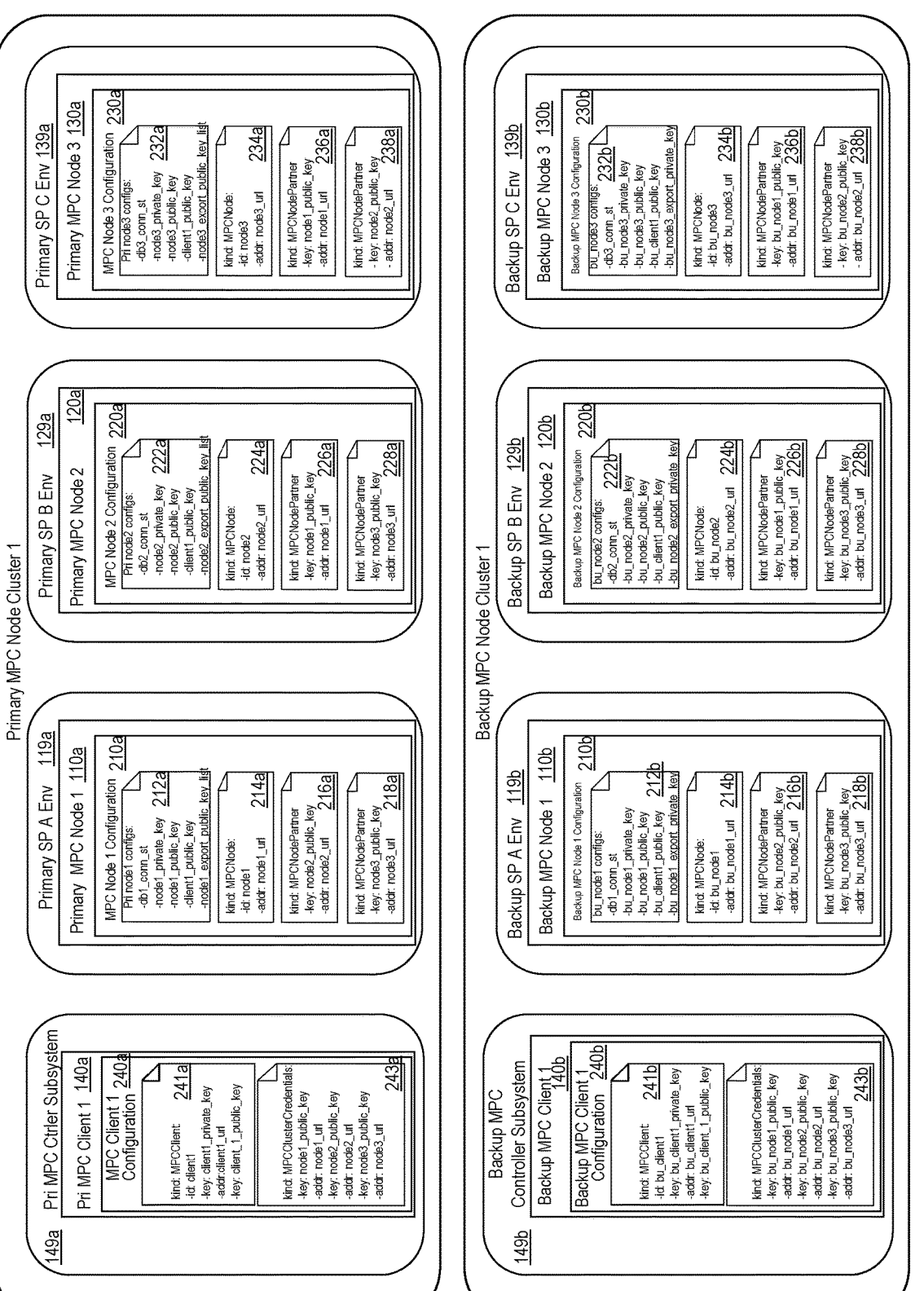
FIG. 2 is a diagram that shows example configuration information for MPC node clusters in primary and backup asset custody subsystems including example information for private key share replication in the backup asset custody subsystem according to certain example embodiments.
Figure 3A:
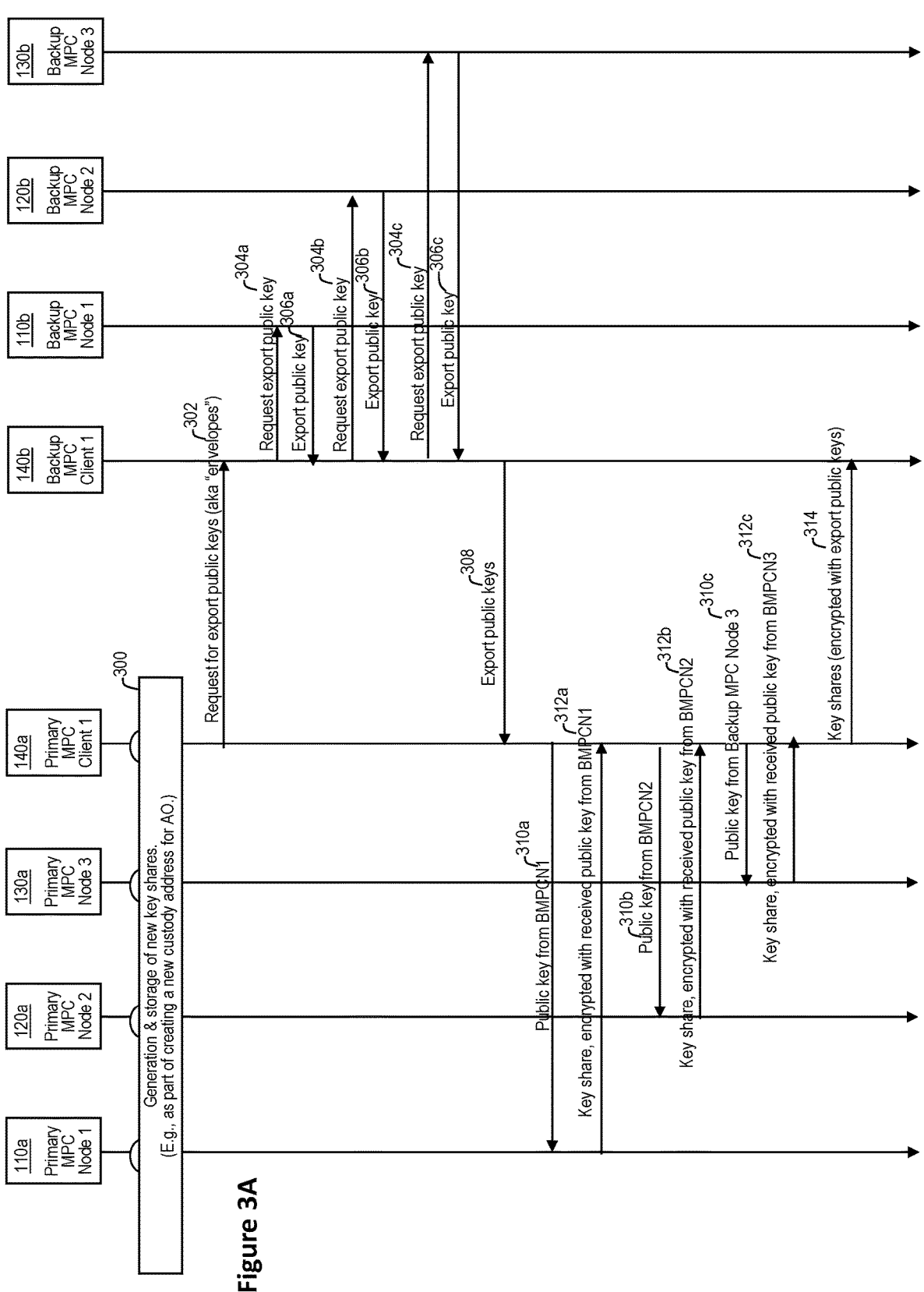
FIG. 3A and FIG. 3B are a sequence diagram that shows a private key share replication process between a primary MPC cluster and a backup MPC cluster according to some embodiments.
Figure 3B:
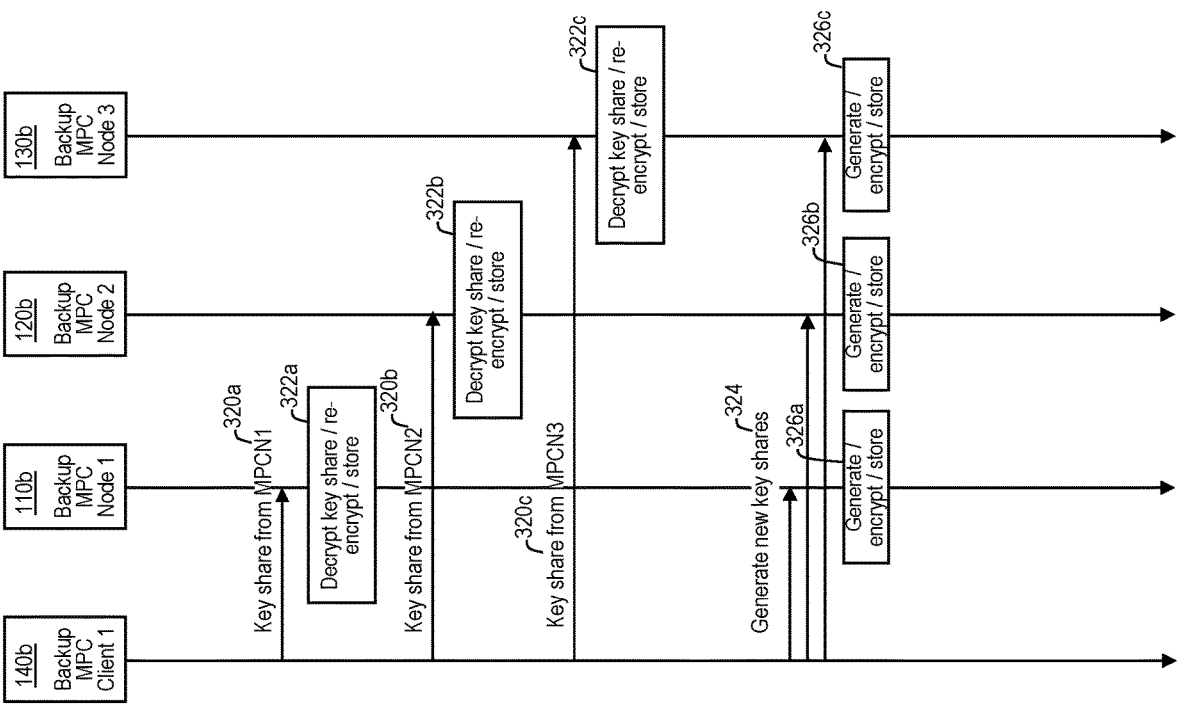
Figure 3B:
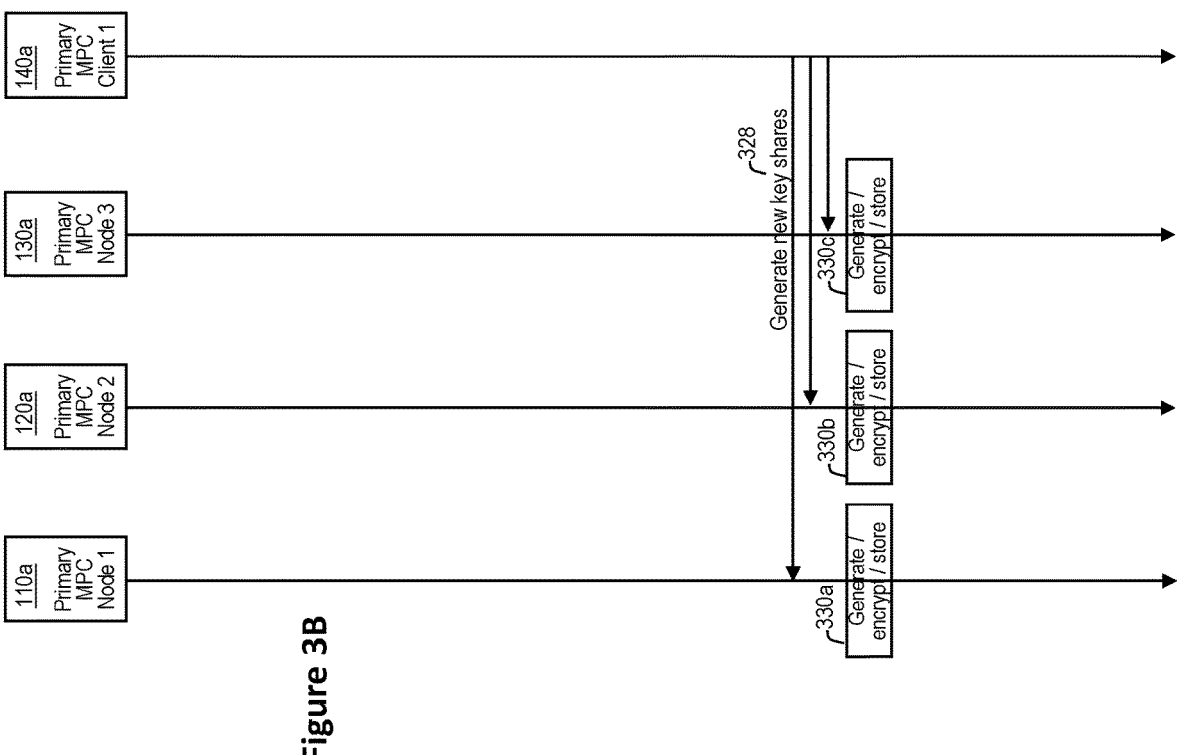
Figure 4:
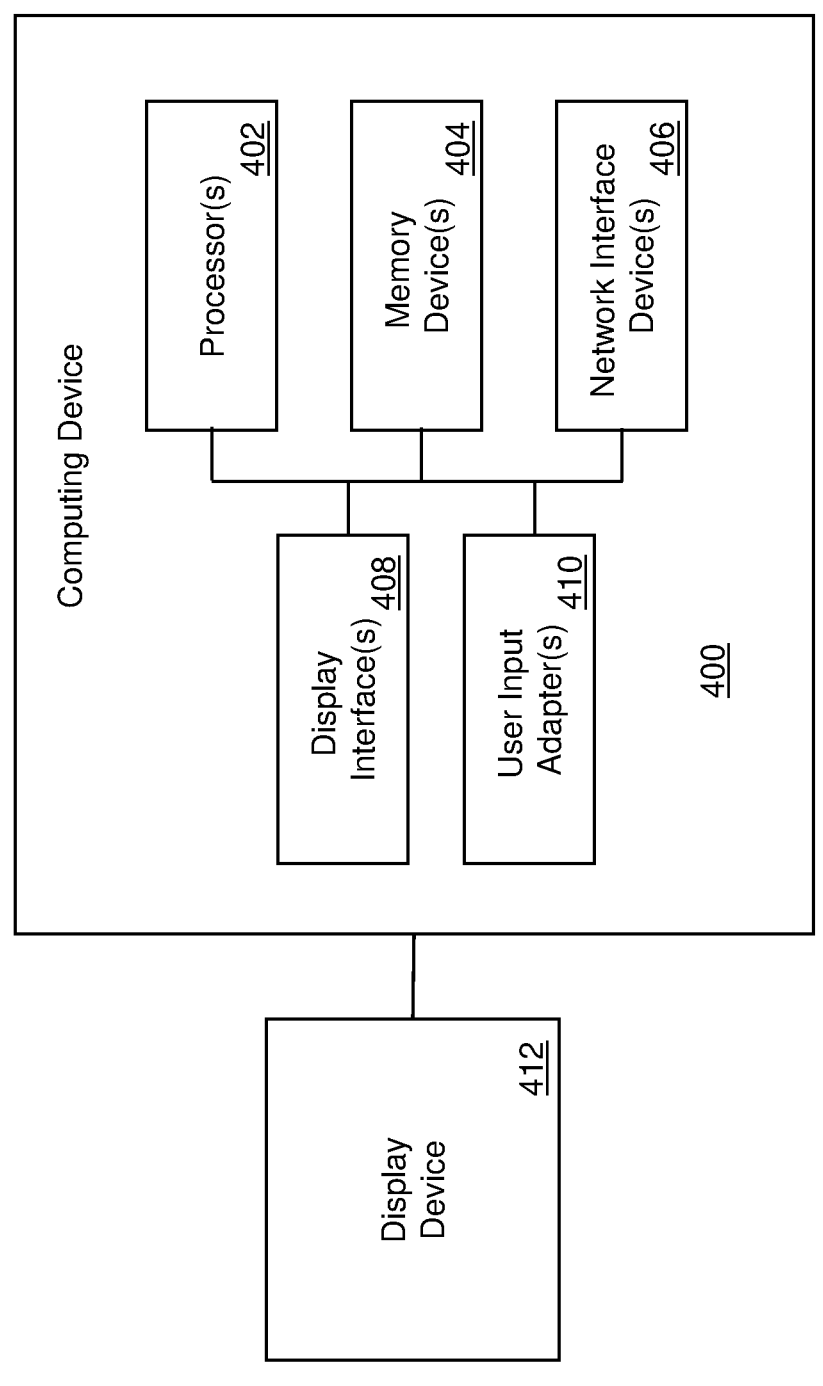
FIG. 4 shows an example computing system that may be used in some embodiments to implement features described herein.

FIG. 1 shows an example architecture for the digital asset custody system (which is the digital asset custody system 100 shown in FIG. 1), including the primary asset custody subsystem and backup asset custody subsystem. FIG. 2 shows an example of configuration information that may be used by components within the digital asset custody system 100. FIGS. 3A and 3B show how the private key share replication process may be implemented in the digital asset custody system 100 in some example embodiments; and FIG. 3B also shows how a private key share re-generation process may be implemented in the digital asset custody system 100 after key share replication in some example embodiments. FIG. 4 shows an example computing system, one or more of which may be used to implement the various components of the digital asset custody system 100.

In a given embodiment, the digital asset custody system 100 may implement many variations on the above-noted processes; but for ease of description, the terms "private key share replication process" and "private key share re-generation process" will be noted in many places in this document in the singular.

As will be described in further detail below, the described digital asset custody system 100 and features thereof (including the above-noted processes) relate to improvements in information security and reliability of distributed systems and cloud computing systems.

3. Description of FIG. 1—Digital Asset Custody System

In many places in this document, including the description of FIG. 1, computer-implemented function blocks, functions, actions, and/or operations may be implemented using software nodes or module(s). The terms "node" and "module" as used in this document each refer to a computing resource that uses software to execute a computer program or code and/or deploy a computer application. In some embodiments, each "node" as described herein may be implemented on its own virtual machine. As another example, a node may also be implemented by a computing process, a computing thread, a module of software code, or a container. In some embodiments, a node may be implemented as a container that runs on a virtual machine.

It should be understood that function blocks, operations, signaling, communication of data, and/or other actions performed by node(s) or software module(s) as described in this document are actually implemented by underlying hardware (such as at least one hardware processor and at least one memory device) according to program instructions specified by the software node(s) or module(s); details of an example computer system with at least one hardware processor and at least one memory device are provided in the description of FIG. 4. In addition, the illustrated and/or described nodes, functions, and actions may also be implemented using various configurations of hardware (such as ASICS, PLAs, discrete logic circuits, etc.) alone or in combination with programmed computer(s).

FIG. 1 shows an example digital asset custody system 100 according to certain example embodiments. The digital asset custody system 100 may be implemented using "clusters" of components, wherein each cluster includes MPC nodes and an MPC client. (A "cluster" may also be referred to as an "MPC cluster," "MPC node cluster," or similar). In a given cluster, the MPC nodes may each separately generate a private key share during a wallet creation process; the key shares may then be used to sign a digital asset transaction using MPC protocols in connection with the transaction generation process. In this approach, the digital asset custody system 100 does not store full private keys themselves, thereby safeguarding against the theft of digital assets.

The digital asset custody system 100 may custody digital assets on behalf of "asset owners" (AOs). An AO may be an entity (such as an organization, a corporation (or other kind of legal entity), or a natural person) that owns or otherwise controls some digital assets. In various embodiments, the digital asset custody system 100 may be configured to custody digital assets that include cryptocurrencies (e.g., Bitcoin, Ethereum), non-fungible tokens (NFTs), fungible tokens, and/or other types of digital assets that may be represented in various blockchain and/or distributed ledger systems. In various embodiments, the digital asset custody system 100 may be configured to custody a single type of digital asset or multiple types of digital assets, in various combinations. As one example, the digital asset custody system 100 may be configured to custody Bitcoin and Ethereum.

The digital asset custody system 100 includes a primary asset custody subsystem 104*a* and a backup asset custody subsystem 104*b*, which may be located in separate regions that are geographically remote from each other. In example embodiments, each subsystem 104*a*, 104*b* may be implemented using a different respective cloud computing data center located in different remote geographic locations. The primary asset custody subsystem 104*a* and backup asset custody subsystem 104*b* may be configured to establish a secure communications link or connection, e.g., a virtual private cloud (VPC) peering connection as described below in connection with FIG. 3A. The primary asset custody system may be used to handle operations for the digital asset custody system (e.g., performing operations such as the generating of digital asset transactions); however, in some circumstances (e.g., if there is an issue in the primary asset custody system, and/or for other reasons), the digital asset custody system may switch over to the backup asset custody subsystem, such that the backup asset custody subsystem is then used to handle operations for the digital asset custody system.

The primary asset custody subsystem 104*a* may include an example primary MPC cluster 1 that includes primary MPC node 1 110*a*, primary MPC node 2 120*a*, and primary MPC node 3 130*a* along with a primary MPC client 1 140*a* (all of which are indicated as being in MPC cluster 1 using a dotted background). The backup asset custody subsystem 104*b* may include an example backup MPC cluster 1 that includes backup MPC node 1 110*b*, backup MPC node 2 120*b*, and backup MPC node 3 130*b* along with a backup MPC client 1 140*b* (all of which are indicated as being in backup MPC cluster 1 using a dotted background). Only one MPC cluster is shown in each of the primary and backup asset custody subsystems 104*a*, 104*b* for simplicity and explanation, but it should be understood that (a) the primary asset custody subsystem 104*a* may include many MPC clusters and (b) for every primary MPC cluster created and deployed in the primary asset custody subsystem 104*a*, a backup cluster may be created and deployed in the backup asset custody subsystem 104*b*.

Each MPC cluster is capable of (and dedicated to) performing custody functionality for a single AO; that is to say, private key shares for multiple AO's are not stored in a single MPC cluster. Details regarding example configuration information that may be used by the nodes and/or modules within a given cluster to communicate with each other are provided below in connection with the description of FIG. 2 and/or in the Related Application and that may be used by the primary and backup MPC clients to communicate with each other.

For each of the primary and backup MPC clusters, each of the MPC nodes may operate in a different signing party (SP) computing environment; each signing party computing environment may be, e.g., a private network or other kind of computing infrastructure, and each may be associated with, and/or operated by or on behalf of, a different "signing party." A signing party may be an entity such as an organization, a corporation (or other kind of legal entity), or a natural person. FIG. 1 shows an example with three different signing party computing environments for the primary asset custody subsystem 104*a*: Primary Signing Party A Computing Environment 119*a* (which will also be referred to as "Primary SP-A Environment 119*a*"), Primary Signing Party B Computing Environment 129*a* ("Primary SP-B Environment 129*a*"), and Primary Signing Party C Computing Environment 139*a* ("Primary SP-C Environment 139*a*"). FIG. 1 also shows an example with three different signing party computing environments for the backup region asset custody subsystem 104*b*: Backup Signing Party A Computing Environment 119*b* (which will also be referred to as "Backup SP-A Environment 119*b*"), Backup Signing Party B Computing Environment 129*b* ("backup SP-B Environment 129*b*"), and Backup Signing Party C Computing Environment 139*b* ("Backup SP-C Environment 139*b*"). In some embodiments, the signing parties in each of the custody subsystems 104*a*, 104*b* may be subdivisions (or distinct units, or distinct teams) within the same corporation. Consistent with the foregoing, a corporation's technology operations team for each of the regions might be Signing Party A, the corporation's information security team for each of the regions might be Signing Party B, and the corporation's customer support team might be Signing Party C. Each signing party may be responsible for managing its own independent computing environment; and in some embodiments, each signing party has no access to the other signing party environments. In some embodiments, each MPC node in the digital asset custody system 100 is configured in its signing party environment as a container that operates within a virtual machine.

In certain example embodiments, the digital asset custody system 100 may be implemented, or portions of it may be implemented, in a cloud computing environment, such an environment provided by Amazon Web Services (AWS), Microsoft Azure, Google Cloud Platform, IBM Cloud, or Oracle Cloud Infrastructure, etc., and may be implemented across one or more physical computer systems (an example computer system is shown in FIG. 4). In some embodiments that involve using a cloud computing environment, each signing party may have its own separate account with a given cloud provider, and each signing party computing environment may be provide resources for each MPC signing's party's respective separate account. However, the cloud provider accounts may be logically grouped, e.g., the primary and backup signing party computing environments 119*a*, 119*b* may each be associated with the same cloud provider account for signing party A; the primary and backup signing party computing environments 129*a*, 129*b* may each be associated with the same cloud provider account for signing party B, and the primary and backup signing party computing environments 139*a*, 139*b* may each be associated with the same cloud provider account for signing party C. However, the physical network and computing resources for each of the computing environments 119*a*, 119*b*, 129*a*, 129*b*, 139*a*, 139*b* are isolated from the other environments 119*a*, 119*b*, 129*a*, 129*b*, 139*a*, 139*b* within the cloud provider's systems. Alternatively or additionally, in some embodiments the MPC signing parties' accounts may be distributed across multiple cloud providers and their corresponding systems. Alternatively or additionally, in some example embodiments, the signing party's computing environments may be implemented across different data centers.

As noted above, MPC nodes in a cluster may be configured to operate in a different signing party environment. Additionally, according to some embodiments, a group of MPC nodes can be designated as being in a "set" or ("signing party set," or "MPC set," "node set," "MPC node set," or similar), where each MPC node in the "set" operates in the same signing party computing environment, and considered to be associated with the signing party that is responsible for that signing party computing environment. Although not shown in FIG. 1, in an example where more than one MPC cluster is deployed in the primary asset custody subsystem 104*a*, each of the primary SP environments 119*a*, 129*a*, 139*a* may include a set of two or more MPC nodes (and each of the backup SP environments 119*b*, 129*b*, 139*b* would correspondingly also include a set of two or more MPC nodes).

In addition to the signing party environments 119*a*, 119*b*, 129*a*, 129*b*, 139*a*, 139*b*, the digital asset custody system 100 may include a primary MPC controller subsystem 149*a* and a backup MPC controller subsystem 149*b*, as shown in FIG. 1. The primary MPC controller subsystem 149*a* may include one or more primary MPC clients such as MPC Client 1 140*a*, and the backup MPC controller subsystem 149*b* may include one or more MPC clients such as MPC client 1 140*b*. Each MPC client in each MPC controller subsystem may be deployed as part of a cluster (as shown in FIG. 1 and noted above), and among other functionality may communicate with the MPC nodes in its cluster in connection with the wallet creation process and transaction generation process. Alternatively or additionally, each MPC client in each MPC controller subsystem may function as an interface into that MPC client's cluster; i.e., other components in the digital asset custody system 100 may invoke functionality that can be performed by the cluster via communication with the MPC client.

The primary MPC controller subsystem 149*a* may include the primary MPC controller 146*a*, and the backup MPC controller subsystem 149*b* may include the backup MPC Controller 146*b*. The primary MPC controller subsystem 149*a* may also include a primary blockchain service 147*a*

(which may also be referred to as a "primary distributed ledger service" or similar), and the backup MPC controller subsystem 149*b* may also include a backup blockchain service 147*b* (which may also be referred to as a "backup distributed ledger service" or similar). Each blockchain service may communicate information to/from a blockchain network 102 (details on which are provided in the Related Application). As one example, each blockchain service may communicate with the blockchain network 102 as part of the transaction generation process, by transmitting a blockchain transaction to the blockchain network 102. Public blockchain addresses (i.e., custody addresses) that the digital asset custody system 100 may use to custody digital assets may be implemented in accordance with (and/or be said to "exist" in) the blockchain network 102; and/or the blockchain network 102 may processes transactions that are sent to it in the signature generation process. Further example details are provided in the Related Application.

In some embodiments, the MPC controller subsystem 149*a* (and, for clarity, the components thereof, such as MPC client 1 140*a*) may operate within the same computing environment within which other components of the digital asset custody system 100 (such as the primary frontend module 164*a*) operate; in other embodiments, the MPC controller subsystem 149*a* may operate in its own dedicated computing environment (e.g., a private network); in other embodiments, the MPC controller subsystem 149*a* may operate within one of the signing party computing environments 119*a*, 129*a*, 139*a*. Similarly, in some embodiments, the MPC controller subsystem 149*b* (and, for clarity, the components thereof, such as MPC client 1 140*b*) may operate within the same computing environment within which other components of the digital asset custody system 100 (such as the backup frontend module 164*b*) operate; in other embodiments, the MPC controller subsystem 149*a* may operate in its own dedicated computing environment (e.g., a private network); in other embodiments, the MPC controller subsystem 149*a* may operate within one of the signing party computing environments 119*a*, 129*a*, 139*a*.

Also shown in FIG. 1 are a primary frontend module 164*a* and an AO device 160 (which includes the AO frontend module 162); the primary frontend module 164*a* and AO device 160 may implement, among other functionality, functionality that allows an AO user to interface with the primary digital asset custody system 104*a*. Similarly, the backup frontend module 164*b* and the AO device 160 (which includes the AO frontend module 162) may implement, among other functionality, functionality that allows an AO user to interface with the secondary digital asset custody system 104*b*.

The AO device 160 (which may be, e.g., a computer, tablet, smartphone, or other computing device) may communicate over one or more data communications networks with the digital asset custody system 100. The frontend module 164 and the AO frontend module 162 may allow the AO user to submit requests to the digital asset custody system 100, such as, e.g., a request to create a new wallet or public address for the AO (which may then be created, using the wallet creation process). Alternatively, some or all of the functionality of the AO frontend modules 162 and/or 164*a* may be implemented using one or more application programming interfaces (APIs), e.g., an API may be used to interface with the digital asset custody system 100. Further example details regarding the frontend modules 164*a*, 164*b* and API example implementations are provided in the Related Application.

With the architecture of the digital asset custody system 100 shown in FIG. 1, because different private key shares are held in the separate signing party environments 119*a*, 119*b*, 129*a*, 129*b*, 139*a*, 139*b*, no single signing party has on its own access to or can generate an AO's private key, and thus no single signing party can validly sign a blockchain transaction for an AO; this contributes to the security of the digital asset custody system 100.

As described above, each of the primary and backup asset custody subsystems 104*a*, 104*b* may be implemented using a virtual private cloud (VPC). Each VPC permits virtual private data packet communication links to be established between signing parties (SPs) in different computing environments for each asset custody subsystem. For example, virtual private communication links may be established between primary SP A environment 119*a*, primary SP B environment 129*a*, and primary SP C environment 139*a* in the primary asset custody subsystem 104*a*, and virtual private communication links may be established between backup SP A environment 119*a*, backup SP B environment 129*b*, and backup SP C environment 139*b* in the backup asset custody subsystem 104*b*.

In addition to these VPC data communication links, a secure inter-region VPC network connection, such as an inter-region VPC peering connection, may be established between the primary MPC client 1 140*a* in the primary asset custody subsystem 104*a* and the backup MPC client 1 140*b* in the backup asset custody subsystem 104*b* as shown in FIG. 1. After the VPC peering connection is configured, the primary MPC client 1 140*a* and the backup MPC client 1 140*b* may perform a mutual authentication process, e.g., such as a mutual transport layer security (MTLS) process. Each MPC client 140*a*, 140*b* may perform a relay type of communications service for the MPC nodes in its corresponding cluster to facilitate replicating private key shares associated with the primary MPC nodes in the primary asset custody subsystem 104*a* in the corresponding backup MPC nodes in the backup asset custody subsystem 104*b* in a secure and reliable way. The inter-region VPC peering connection between the two VPCs implementing the primary and backup asset custody subsystems 104*a*, 104*b* enables data packets to be routed between the two VPCs using private data packet addresses, e.g., private IPv4 addresses or IPv6 addresses, without using a gateway, a virtual private network (VPN) connection, or a network appliance. A benefit of this implementation is that the traffic remains in a private IP space and therefore does not traverse the public internet thereby reducing security threats and attacks.

The digital asset custody system 100 may implement a private key share replication process to replicate private key shares held in the primary asset custody subsystem 104*a* in the backup asset custody subsystem 104*b* so that the backup asset custody subsystem 104*b* is ready to take over should the primary asset custody subsystem 104*a* fail or otherwise require the backup asset custody subsystem 104*b* to take over for the primary asset custody subsystem 104*a*. Using example embodiments of the digital asset custody system 100 in FIG. 1 and the example configuration information in FIG. 2 described below, a secure private key share replication process may be used to replicate private key shares held by the primary MPC nodes in the primary MPC node cluster (each primary MPC node stores its corresponding key share) of the primary asset custody subsystem 104*a* in the corresponding backup MPC nodes in the backup MPC node cluster of the backup asset custody subsystem 104*b*. The backup MPC client may send an export public key from each backup MPC node in the backup MPC cluster over the secure inter-region VPC network connection to the primary MPC client, where each export public key is part of a corresponding export public key-export private key pair. The primary MPC client may send each export public key to a corresponding primary MPC node in the primary MPC cluster, and in response, receive from each primary MPC node in the primary MPC cluster a corresponding encrypted private key share encrypted with a corresponding export public key. The primary MPC client may send the encrypted private key shares over the secure inter-region VPC network connection to the backup MPC client, and the backup MPC client may send the encrypted private key shares to corresponding backup MPC nodes in the backup MPC cluster. Each backup MPC node in the backup MPC cluster may decrypt a corresponding encrypted private key share using the export private key from the corresponding export public key-export private key pair to obtain a corresponding backup private key share, and may store the decrypted corresponding backup private key share. In example embodiments, this private key share replication process is performed after the MPC clusters for an AO have been configured and deployed in the primary and backup subsystems. Consistent with the preceding sentence, the private key shares are created in various embodiments during (and/ or as part of) the creation of an AO wallet, or on-demand after the creation of the AO wallet.

Once the key share replication process is complete, the primary asset custody subsystem 104a may perform transactions for asset owners using for example the example transaction generation process described in conjunction with FIG. 7 of the Related Application. This example transaction generation process may include signing of a new digital asset transaction by the nodes in an MPC cluster using private key shares, and the transmission of the signed digital asset transaction to a blockchain network. In response to a request for the digital asset custody system 100 to sign a blockchain transaction that involves transferring some digital assets in the asset owner's digital wallet to a destination public blockchain address, the primary MPC Client 1 140a and primary MPC nodes 110a, 120a, and 130a in the primary MPC cluster 1 may perform substantially as described in the example of FIG. 7 of the Related Application to initiate the generation and signing of a digital asset transaction including the components 110a, 120a, 130a, 140a in the primary MPC cluster 1 exchanging data messages and using the respective private key shares of the nodes 110a, 120a, 130a (in accordance with one or more MPC protocols) to generate the signed transaction (with the signed transaction including the transaction request information or portions thereof). After the transaction is generated/signed, the MPC Client 1 140a may transmit the signed transaction to the blockchain service 147a. If the operation of the digital asset custody system is switched over to the backup asset custody subsystem 104b, a similar transaction generation process may be performed. In response to a request for the digital asset custody system 100 to sign a blockchain transaction that involves transferring some digital assets in the asset owner's digital wallet to a destination public blockchain address, the backup MPC Client 1 140b and primary MPC nodes 110a, 120a, and 130a in the primary MPC cluster 1 may perform substantially as described in the example of FIG. 7 of the Related Application to initiate the generation and signing of a digital asset transaction including the components 110b, 120b, 130b, 140b in backup MPC cluster 1 exchanging data messages and using the respective private key shares of the nodes 110b, 120b, 130b (in accordance with one or more MPC protocols) to generate the signed transaction (with the signed transaction including the transaction request information or portions thereof). After the transaction is generated/signed, the MPC Client 1 140b may transmit the signed transaction to the blockchain service 147b.

For enhanced reliability to ensure continuous service in the digital asset custody system 100, the backup digital asset custody subsystem 104b may be switched over to whenever necessary to fulfill one or more operations or functions that the primary digital asset custody subsystem 104a may not be able to perform for whatever reason, e.g., natural disaster, loss of a cloud server, loss of a cloud provider service, power loss, corruption of data, breach of security, malfunction, etc. in the primary digital asset custody subsystem 104a. Any disruption of service for the primary digital asset custody subsystem 104a may trigger switchover to the backup digital asset custody subsystem 104b including for example maintenance or an upgrade of the primary digital asset custody subsystem 104a. The primary digital asset custody subsystem 104a may send a signal to the backup digital asset custody subsystem 104b to switch over to (and/or activate) the backup digital asset custody subsystem 104b. Additionally or alternatively, the backup digital asset custody subsystem 104b may monitor the primary digital asset custody subsystem 104a and detect some indication that activates the backup digital asset custody subsystem 104b to takeover operation for the primary digital asset custody subsystem 104a, e.g., a watchdog timeout functionality, etc. Activation-related signaling and/or detection may be conducted by one or both of the primary MPC client 1 140a and the backup MPC client 1 140b via a secure communications link or connection, e.g., a virtual private cloud (VPC) peering connection, as described below in connection with FIG. 3A.

As noted previously, FIG. 1 shows one deployed MPC cluster (with components 110a, 120a, 130a, 140a) in the primary asset custody subsystem 104a and one deployed MPC cluster (with components 110b, 120b, 130b, 140b) in backup asset custody subsystem 104b. In various embodiments, MPC clusters (such as those noted in the preceding sentence) may be deployed within the digital asset custody system 100 in various ways. In some embodiments, MPC clusters may be deployed in the digital asset custody system 100 as follows: an MPC cluster may be deployed into the primary asset custody subsystem 104a substantially as described with respect to the "cluster deployment process" of the Related Application (e.g., the primary MPC controller 146a shown in FIG. 1 in this document would perform substantially the operations shown as performed by the MPC Controller 146 in FIGS. 3A-3B in the Related Application, to deploy an MPC cluster into the primary asset custody subsystem 104a); then, a corresponding backup MPC cluster may be deployed into the backup asset custody subsystem 104b, also using the cluster deployment process of the Related Application, also with the MPC controller from the primary asset custody subsystem 104a orchestrating the deployment of the MPC nodes in the backup asset custody subsystem 104b (e.g., the primary MPC controller 146a shown in FIG. 1 in this document would perform substantially the operations shown as performed by the MPC Controller 146 in FIGS. 3A-3B in the Related Application, to deploy an MPC cluster into the backup asset custody subsystem 104b, with the primary MPC controller 146a communicating via a secure channel to/from the backup asset custody subsystem 104b).

Although one backup asset custody subsystem 104b is illustrated in FIG. 1, in other example embodiments, there may be one or more additional backup asset custody subsystems that may serve as further backup for the primary asset custody subsystem 104*a* and for the backup asset custody subsystem 104*b* should both of the primary asset custody subsystem 104*a* and the backup asset custody subsystem 104*b* be unable to perform the functions of the digital asset custody system 100.

4. Description of FIG. 2—Example MPC Clusters

FIG. 2 is a diagram that shows example configuration information for the primary MPC node cluster 1 in the primary asset custody subsystem 104*a* and the backup MPC node cluster 1 in the backup asset custody subsystem 104*b* including example information for private key share replication in the backup asset custody subsystem 104*b* according to certain example embodiments.

As in FIG. 1, in FIG. 2, Primary MPC Node Cluster 1 includes three primary MPC nodes (MPC Node 1 110*a*, MPC Node 2 120*a*, and MPC Node 3 130*a*), each of which operates in a respective different computing environment from the three signing party computing environments 119*a*, 129*a*, 139*a*, and MPC Client 1 140*a*, that may store and use configuration information as follows. MPC Node 1 110*a* may store MPC Node 1 Configuration Information 210*a*, which may include different information elements/data, including configuration information 212*a*, configuration information 214*a*, configuration information 216*a*, and configuration information 218*a*. Consistent with the description of analogous configuration information in the Related Application, this configuration information 210*a* may include keys (private & public) that may be used for encrypted communication for MPC Node 1 110*a* to communicate over data communication links with other components 120*a*, 130*a*, 140*a* in the primary MPC node cluster 1 as well as other information.

Configuration information 212*a* (labeled "pri_node1_configs") may include: primary MPC node 1 database connection credentials (db1_conn_str), primary MPC Node 1's MPC private key (node1_private_key), primary MPC Node 1's MPC public key (node1_public_key), a public key for the primary MPC client 1 (client1_public_key), and a primary export public key list for the primary MPC node 1 (node1_export_public_key_list). The primary export public key list may include one primary export public key if there is only one backup asset custody subsystem, or it may include multiple primary export public keys if there are multiple backup asset custody subsystems. The term "export" refers to a portion of the key share replication process, as described in detail below with respect to FIGS. 3A-3B, where the backup MPC client 140*b* exports (sends) to the primary MPC client 140*a* export public keys from each of the backup MPC nodes 1-3 120*a*, 130*a*, 140*a* to be used by corresponding primary nodes 1-3 120*a*, 130*a*, 140*a* to encrypt their respective private key shares for transport to the backup asset custody subsystem and for replication in the corresponding backup MPC nodes 1-3 120*a*, 130*a*, 140*a*.

Configuration information 214*a* (labeled "kind: MPCNode") may include: an MPC node label (id: node1) and MPC Node 1's address/URL (addr: node1_url). (When the term "address" is used in referring to elements shown in FIG. 2, it should be understood that in some embodiments the address may be an Internet Protocol (IP) address.)

Configuration information 216*a* (labeled "kind: MPCNodePartner," to indicate that configuration information 216*a* relates to a partner MPC node that is a partner to MPC Node 1 110*a* included in MPC Node Cluster 1) may include: MPC Node 2's public key (key: node 2_public_key) and an address/URL for MPC Node 2 (addr: node2_url). Configuration information 218*a* (labeled "kind: MPCNodePartner") may include: MPC Node 3's public key (key: node 3_public key) and an address/URL for MPC Node 3 (addr: node3_url).

Primary MPC Node 1 110*a* may use the MPC Node 1 Configuration Information 210*a* in various example ways such as those described in the Related Application. Alternatively or additionally, MPC Node 1 110 may use the node1_public key, node1_private key information, and client1_public key referenced above to communicate over data communication links with the other components 120*a*, 130*a*, 140*a* in the cluster. For example, MPC node 1 110*a* may use the public key for the MPC client 1 140*a* (client1_public_key) from configuration information 212*a* to encrypt information that it sends over a data communication link to MPC client 1 140*a*. Similarly, the other components 120*a*, 130*a*, 140*a* in the cluster may have a public key for MPC node 1 110*a* (this is shown in the node1_public_key element in configuration information 243*a* in MPC client 1 140*a*, the node1_public_key element in configuration information 226*a* in MPC node 2 120*a*, and the node1_public_key element in configuration information 236*a*); those other components 120*a*, 130*a*, 140*a* may use this public key to encrypt information that they send over respective data communication links to MPC node 1 110*a*, and MPC node 1 110*a* may use its private key (node1_private_key in configuration information 212*a*) to decrypt such information after receipt. Alternatively or additionally, MPC node 1 110*a* may use the address/URL information in configuration information 214*a*, 216*a*, and 218*a* (as well as address/URL information for MPC client 1 140*a*, not shown in FIG. 2) to locate, establish data communication links to, and/or communicate with the other components 120*a*, 130*a*, 140*a* in the primary MPC node cluster 1.

MPC node 2 120*a* may store MPC node 2 Configuration Information 220*a*, which may include configuration information 222*a*, 224*a*, 226*a*, 228*a*, which correspond/are analogous to the configuration information 212*a*, 214*a*, 216*a*, 218*a* stored by MPC node 1 110*a* as described above; and MPC node 2 120*a* may use this configuration information 222*a*, 224*a*, 226*a*, 228*a* in analogous fashion as described above with respect to MPC node 1 110*a*, including to communicate with the other components 110*a*, 130*a*, 140*a* in the cluster. Similarly, MPC node 3 130*a* may store MPC node 3 configuration information 130*a*, which may include configuration information 232*a*, 234*a*, 236*a*, 238*a*, which also corresponds/is analogous to the configuration information 212*a*, 214*a*, 216*a*, 218*a* stored by MPC Node 1 110*a* as described above; and MPC Node 3 130*a* may also use this configuration information 232*a*, 234*a*, 236*a*, 238*a* in analogous fashion as described above with respect to MPC Node 1 110*a*, including to communicate with the other components 110*a*, 120*a*, 140*a* in the primary MPC node cluster 1.

MPC Client 1 140*a* may store MPC client 1 configuration information 240*a*, which may include configuration information 241*a* and configuration information 243*a*. Configuration information 241*a* (labeled "MPCClient") may include: an MPC client label (id: client1), an MPC client private key (client_1_private_key), an address/URL for MPC Client 1 (addr: client1_url), and a public key for MPC Client 1 (key: client1_public_key). Configuration information 243*a* (labeled "MPCClusterCredentials") may include:

a public key (key: node1_public_key) and an address/URL (addr: node1_url) for MPC Node 1 110a; a public key (key: node2_public_key) and an address/URL (addr: node2_url) for MPC Node 2 120a; and a public key (key: node3_public_key) and an address/URL (addr: node3_url) for MPC Node 3 130a. In analogous fashion as that described above with respect to the other components 110a, 120a, 130a in the cluster, MPC Client 1 140a may use the public key, private key, and address/URL information stored in configuration information 241a and configuration information 243a to communicate over data communication links with the other components 110a, 120a, 130a in the primary MPC node cluster 1.

The keys shown in FIG. 2 (e.g., client1_private_key in configuration information 212a, client1_public_key in configuration information 212a, node2_public_key in configuration information 243a, and so on) that, as noted above, are used for data communication amongst the components 110a, 120a, 130a, 140a in primary MPC node cluster 1 are referred to herein as "node keys," "cryptographic node keys," "MPC node keys," "cluster keys," "cryptographic cluster keys," and similar. The export keys (e.g., node1_export_public_key, etc.) are used for communication with components in the backup asset custody subsystem 104b and are referred to as "export public keys."

The use of node keys for encryption/decryption as described above facilitates the components 110a, 120a, 130a in MPC Node Cluster 1 to securely communicate with each other (i.e., to communicate with each other using asymmetric encryption); other components (for example, MPC nodes in other clusters from MPC Node Cluster 1 that do not have the node keys for MPC Node Cluster 1 would not be able to participate in encrypted communication with the components 110a, 120a, 130a in MPC Node Cluster 1 in the same manner. These communication and access boundaries contribute to protection and security for digital assets custodied in, and digital asset transactions generated by, the digital asset custody system 100. These node keys and these export public keys are distinct from each other and from the private key shares that are used by MPC nodes in the digital asset custody system 100 to sign transactions. The use of export public keys will be described below.

Consistent with FIG. 1, FIG. 2 shows a backup MPC node cluster 1 including three backup MPC nodes (backup MPC node 1 110b, backup MPC node 2 120b, and backup MPC node 3 130b), each of which operates in a respective different computing environment from the three signing party computing environments 119b, 129b, 139b, and backup MPC client 1 140b that store and use configuration information as follows. Although there may be multiple backup MPC node clusters, only one backup MPC node cluster is shown for convenience. Backup MPC node 1 110b may store backup MPC node 1 configuration information 210b, which may include different information elements/ data, including backup configuration information 212b, backup configuration information 214b, backup configuration information 216b, and backup configuration information 218b. As described in the Related Application, this backup configuration information 210b may include keys (private & public) that may be used for encrypted communication for backup MPC node 1 110b to communicate over data communication links with other components 120b, 130b, 140b in the backup MPC node cluster 1 as well as other information.

Backup configuration information 212b (labeled "bu_node1configs") may include: backup MPC node 1 database connection credentials (db1_conn_str), backup MPC node 1's MPC private key (bu_node1_private_key), backup MPC node 1's MPC public key (bu_node1_public_key), a backup public key for the backup MPC client 1 (bu_client1_public_key), and a backup export private key list backup MPC node 1 (node1_export_private_key_list). The backup export private key list may include one backup export private key if there is only one backup asset custody subsystem, or it may include multiple backup export private keys if there are multiple backup asset custody subsystems.

Backup configuration information 214b (labeled "kind: MPCNode") may include: a backup MPC node label (id: bu_node1) and backup MPC Node 1's address/URL (addr: bu_node1_url). Backup configuration information 216b (labeled "kind: MPCNodePartner," to indicate that backup configuration information 216b relates to a backup partner MPC node that is a partner to backup MPC Node 1 110b included in the backup MPC Node Cluster 1) may include: backup MPC Node 2's public key (key: bu_node 2_public_key) and an address/URL for backup MPC Node 2 (addr: bu_node2_url). Backup configuration information 218a (labeled "kind: MPCNodePartner") may include: backup MPC Node 3's public key (key: bu_node 3_public_key) and an address/URL for backup MPC Node 3 (addr: bu_node3_url).

Backup MPC Node 1 110b may use the backup MPC node 1 configuration information 210b in various example ways such as those described in the Related Application. Alternatively or additionally, backup MPC node 1 110b may use the bu_node1_public key, bu_node1_private key information, and bu_client1_public key referenced above to communicate over data communication links with the other components 120b, 130b, 140b in the backup MPC node cluster 1. For example, backup MPC node 1 110b may: use the public key for the backup MPC client 1 140b (bu_client1_public_key) from configuration information 212b to encrypt information that it sends to backup MPC client 1 140b. Similarly, the other components 120b, 130b, 140b in the cluster may have a public key for backup MPC node 1 110b (this is shown in the bu_node1_public_key element in configuration information 243b in backup MPC client 1 140b, the bu_node1_public_key element in configuration information 226b in backup MPC node 2 120b, and the bu_node1_public_key element in configuration information 236b); those other components 120b, 130b, 140b may use this public key to encrypt information that they send over data communication links to backup MPC node 1 110b, and backup MPC node 1 110b may use its private key (bu_node1_private_key in configuration information 212b) to decrypt such information after receipt. Alternatively or additionally, backup MPC node 1 110b may use the address/ URL information in configuration information 216b, 218b (as well as address/URL information for MPC client 1 140b, not shown in FIG. 2) to locate, establish connections to, and/or communicate with the other backup components 120b, 130b, 140b in the backup MPC node cluster 1.

Backup MPC Node 2 120b may store backup MPC node 2 configuration information 220b, which may include configuration information 222b, 224b, 226b, 228b, which correspond/are analogous to the configuration information 212b, 214b, 216b, 218b stored by backup MPC node 1 110b as described above; and backup MPC node 2 120b may use this configuration information 222b, 224b, 226b, 228b in analogous fashion as described above with respect to backup MPC node 1 110b, including to communicate over data communication links with the other components 110b, 130b, 140b in the backup cluster. Similarly, Backup MPC Node 3 130b may store backup MPC node 3 configuration information 230*b*, which may include configuration information 232*b*, 234*b*, 236*b*, 238*b*, which also corresponds/is analogous to the configuration information 212*b*, 214*b*, 216*b*, 218*b* stored by backup MPC node 1 110*b* as described above; and backup MPC node 3 130*b* may also use this configuration information 232*b*, 234*b*, 236*b*, 238*b* in analogous fashion as described above with respect to backup MPC node 1 110*b*, including to communicate over data communication links with the other backup components 110*b*, 120*b*, 140*b* in the backup MPC node cluster 1.

Backup MPC client 1 140*b* may store Backup MPC client 1 configuration information 240*b*, which may include configuration information 241*b* and configuration information 243*b*. Configuration information 241*b* (labeled "MPCClient") may include: a backup MPC client label (id: bu_client1), a backup MPC client private key (bu_client_1_private_key), an address/URL for the backup MPC Client 1 (addr: bu_client1_url), and a public key for the backup MPC client 1 (key: bu_client1_public_key). Configuration information 243*b* (labeled "MPCClusterCredentials") may include: a backup public key (key: bu_node1_public_key) and an address/URL (addr: bu_node1_url) for the backup MPC node 1 110; a public key (key: bu_node2_public_key) and an address/URL (addr: bu_node2_url) for backup MPC node 2 120*b*; and a public key (key: bu_node3_public_key) and an address/URL (addr: bu_node3_url) for backup MPC Node 3 130*b*. In analogous fashion as that described above with respect to the other components 110*b*, 120*b*, 130*b* in the backup cluster, backup MPC client 1 140*a* may use the backup public key, backup private key, and backup address/URL information stored in configuration information 241*b* and configuration information 243*b* to communicate over data communication links with the other backup components 110*b*, 120*b*, 130*b* in the backup MPC node cluster 1.

The use of node keys for encryption/decryption as described above facilitates the components 110*b*, 120*b*, 130*b* in the backup MPC node cluster 1 to securely communicate with each other (i.e., to communicate with each other using asymmetric encryption); other components (for example, backup MPC nodes in other clusters from backup MPC node cluster 1 that do not have the node keys for backup MPC node cluster 1 would not be able to participate in encrypted communication with the backup components 110*b*, 120*b*, 130*b* in backup MPC node cluster 1 in the same manner. These communication and access boundaries contribute to protection and security for digital assets custodied in, and digital asset transactions generated by, the digital asset custody system 100.

The backup export keys (e.g., bu_node1_export_private_key, etc.) are used for communication with the primary asset custody subsystem and are referred to as "export private keys." The backup node keys described above and the backup export private keys are distinct from each other and from the private key shares that are used by backup MPC nodes in the digital asset custody system 100 to sign transactions. The use of backup export private keys will be described below.

Whenever it is described in this document that any component in a deployed MPC cluster communicates with one or more other components in that MPC cluster (including, for example, in connection with the processes shown in FIGS. 3A and 3B), it should be understood that, in some embodiments, such communication takes place with the use of node keys as described above and/or in accordance with other configuration information as described above. In example embodiments, communications between the primary asset custody subsystem 104*a* and the backup asset custody subsystem 104*b* are implemented via one or more secure communication links between the primary MPC client 1 140*a* and the backup MPC client 1 140*b* using export public keys. As explained in the next section, the export public and private key configuration information shown in FIG. 2 may be used for private key share replication as will be described in connection with the example processes of FIGS. 3A-3B.

5. Description of FIGS. 3A-3B—Private Key Share Replication Process

FIGS. 3A-3B assume that one or more primary MPC node clusters and primary MPC clients and one or more backup MPC node clusters and backup MPC clients are configured and deployed. In example embodiments, the backup MPC nodes 1-3 110*b*, 120*b*, 130*b* and backup MPC client 1 140*b* in the backup MPC cluster 1 have been configured and deployed by the primary MPC controller 146*a*, but other configuration and deployment approaches may be used.

In the example process illustrated in FIG. 3A, the primary MPC nodes 1-3 110*a*, 120*a*, 130*a* may communicate with the primary MPC client 1 140*a* in the primary asset custody subsystem 104*a* to generate new key shares for an AO, e.g., as part of creating a new custody address for the AO. Each primary MPC node stores its private key share in a node database, e.g., a node database dedicated to that node. In example embodiments, each MPC node may encrypt, e.g., using AES, AESGCM, or other encryption protocol, its private key share before storage in the node database.

Initially at step 300, (e.g., during or shortly after deployment of the primary MPC node cluster 1 in example embodiments), the primary MPC client 1 140*a* may communicate with the primary MPC nodes 1-3 110*a*-110*c* so that they generate and store in respective primary MPC node secure databases or other type of data storage new private key shares for blockchain transactions for the AO associated with the primary MPC node cluster 1. Each primary MPC node in the primary MPC node cluster 1 has its own private key share but does not know or have access to the private key shares associated with any of the other nodes in the primary MPC node cluster 1. In example embodiments, the new private key shares may be generated using one or more MPC protocols, and/or may be created as part of the creation of a new custody public address for the AO.

In step 302, the primary MPC client 1 140*a* may send a data message over the inter-region VPC peering connection to the backup MPC client 1 140*b* requesting "export" public keys held by the backup MPC nodes 1-3 110*b*-130*b*. As described above, after the VPC peering connection is configured, the primary MPC client 1 140*a* and the backup MPC client 1 140*b* may perform a mutual authentication process, e.g., such as a mutual transport layer security (MTLS) process, before data messages can be effectively communicated between the clients on the VPC peering connection. In example embodiments, export keys are part of an "envelope" encryption protocol. Each backup MPC node 1-3 110*b*-130*b* has a corresponding export private key-export public key pair, where the export public key may be derived from the export private key. The export public key can be analogized to an "envelope" in that an export public key of an export private key-export public key pair may be used to encrypt secret data, e.g., a private key share. The encrypted secret data is thus "sealed" in a data envelope by being encrypted with export public key, and that envelope can only be opened, i.e., the encrypted secret data decrypted, using the export private key of the export private key-export public key pair, which is known only one of by the backup MPC nodes.

In response to the request from the primary MPC client 1 140a, the backup MPC client 1 140b, in respective steps 304a, 304b, and 304c, may send a request to each backup MPC node 1-3 110b-130b requesting the corresponding export public key (e.g., envelope) from each backup MPC node. The requests may be sent sequentially or in parallel. Each backup MPC node 1-3 110b-130b, in respective steps 306a, 306b, and 306c, sends its corresponding export public key, e.g., derived from the export private key in the export private key-export public key pair, to the backup MPC client 1 140b. The export public keys from the backup MPC nodes 1-3 110b-130b may be sent sequentially or in parallel.

Then, in step 308, the backup MPC client 1 140b may send the export public keys in one or more data messages over the secure inter-region VPC peering connection to the primary MPC client 1 140a, which then sends them to the corresponding primary MPC node in the primary MPC node cluster 1. For example, the primary MPC client 1 140a sends the export public key from the backup MPC node 1 110b to the primary MPC node 1 110a in step 310a; the export public key from the backup MPC node 2 120b to the primary MPC node 2 120a in step 310b; and the export public key from the backup MPC node 3 130b to the primary MPC node 3 130a in step 310a.

After receiving an export public key at step 310a, 310b, 310c, each primary MPC node 1-3 110a-130a may retrieve its corresponding private key share, and if it is encrypted, decrypt it. Each primary MPC node 1-3 110a-130a may then encrypt its corresponding private key share using the export public key it received to "seal" its private key share in an "envelope." For example, the primary MPC node 1 110a may encrypt its corresponding private key share with the export public key received from corresponding backup MPC node 1 110b; the primary MPC node 2 120a may encrypt its corresponding private key share with the export public key received from corresponding backup MPC node 2 120b; and the primary MPC node 3 130a may encrypt its corresponding private key share with the export public key received from corresponding backup MPC node 3 130b. In respective steps 312a, 312b, and 312c, each primary MPC node 1 110a-130a may send its encrypted private share to the primary MPC client 1 140a.

At step 314, the primary MPC client 1 140a may send the encrypted private key shares (received at steps 312, 312b, 312c) to the backup MPC client 1 140b. The encrypted private shares may be sent individually or be included in a single message to the backup MPC client 1 140b. The encrypted private key shares may be sent at step 314 over the inter-region VPC peering connection.

Continuing the process in FIG. 3B, the backup MPC client 1 140b may distribute the encrypted private key shares to the corresponding backup MPC nodes 1-3 110b-130b in respective steps 320a, 320b, and 320c. For example, the backup MPC client 1 140b sends the encrypted private key share from the primary MPC node 1 110a to the backup MPC node 1 110b in step 320a, and the backup MPC node 1 110b decrypts the encrypted private key share using the export private key in the export private key-export public key pair to obtain the private key share from the primary MPC node 1 110a in step 322a. In this way, the private key share from the primary MPC node 1 110a is replicated in the corresponding backup MPC node 1 110b. In example embodiments, the backup MPC node 1 110b re-encrypts the private key share, e.g., using a database encryption, before storing it in a secure database or other type of data storage for the backup MPC node 1 110b in step 322a. Similar operations are performed for the backup MPC node 2 120b and backup MPC node 3 130b in respective steps 322b and 322c to replicate the corresponding private key share from the primary MPC node 2 120a in the corresponding backup MPC node 2 120b and to replicate the corresponding private key share from the primary MPC node 3 130a in the corresponding backup MPC node 3 130b.

In example embodiments, security for the private key shares may be further enhanced by performing a private key share re-generation process in conjunction with or shortly after the private key share replication process described above. MPC key shares are a combination of mathematical values that are used as inputs to a joint computation to equal the full (root) private key. Different combinations of mathematical values corresponding to different private key shares can be used as inputs to the joint computation to equal the same full (root) private key. This mathematical flexibility with MPC may be used in example embodiments to further improve security of private key shares.

In example embodiments, after exporting its private key share, each primary MPC node 1-3 110a-130a either automatically, or in response to a message from the primary MPC client 1 140a to generate a new private key share as shown in step 328 FIG. 3B, may locally generate, in respective steps 330a, 330b, and 330c, a new private key share for the same full (root) private key using a key share generation process(es) (which may include using one or more MPC protocols, and/or Shamir's Secret Sharing (SSS) process). Even though the newly re-generated key shares are different from their respective earlier versions, the re-generated key shares may still be used by the primary MPC client 1 140a to generate the AO's full (root) private key to sign blockchain transactions. In other words, the new and different private key shares may be combined by the primary MPC client 1 140a to generate a valid signature based on the original root private key for the AO. Details of how an MPC client may, in example embodiments, generate a valid signature for the AO based on the private key for the AO using private key shares from MPC nodes in an MPC cluster deployed for the AO are described in the Related Application. Also in respective steps 330a, 330b, and 330c, each primary MPC node 1-3 110a-130a encrypts its re-generated (new) private key share and stores the encrypted re-generated private key share in a secure database or other type of data storage for the node.

Similarly, after receiving and decrypting the private key share from its primary MPC node 1-3 110a-130a, each backup MPC node 1-3 110b-130b either automatically, or in response to a message from the backup MPC client 1 140b in step 324 to generate a new private key share, may locally generate, in respective steps 326a, 326b, and 326c, a new key share for the same root private key for the AO using known MPC key share generation processes (e.g., using a distributed key generation (DKG) approach). So even though the new private key shares are different, they may still be combined by the backup MPC client 1 140b to generate a valid signature based on the original root private key for the AO. Also in respective steps 326a, 326b, and 326c, each backup MPC node 1-3 110b-130b encrypts its re-generated (new) private key share and stores the encrypted re-generated private key share in a secure database or other type of data storage for the node.

At no time during the private key share replication or during the private key share re-generation processes described above do any of the involved components (e.g.,

110a, 110b, 120a, 120b, 130a, 130b, 140a, 140b) possess/ store an entire private key for the wallet for the AO, as the use of MPC protocols allows for operations that correspond to the possession of a private key when the entire private key itself is not used.

Consequently, if the backup digital asset custody subsystem 104b is activated to perform one or more operations or functions (instead of having the primary digital asset custody subsystem 104a perform such operations or functions), the backup nodes and modules configured and deployed in the backup digital asset custody subsystem 104b have the private key shares securely replicated and stored in order to custody digital assets and perform digital asset transactions for the AO in the same way as the primary digital asset custody subsystem 104a.

6. Description of FIG. 4—Example Computing System

FIG. 4 shows an example computing system that may be used in some embodiments to implement features described herein. An example computing device 400 (which may also be referred to, for example, as a "computing device," "computer system," or "computing system") includes one or more of the following: one or more hardware processors 402; one or more memory devices 404; one or more network interface devices 406; one or more display interfaces 404; and one or more user input adapters 410. Additionally, in some embodiments, the computing device 400 is connected to or includes a display device 412. As will explained below, these elements (e.g., the hardware processors 402, memory devices 404, network interface devices 406, display interfaces 404, user input adapters 410, display device 412) are hardware devices (for example, electronic circuits or combinations of circuits) that are configured to perform various functions for the computing device 400.

In some embodiments, each or any of the hardware processors 402 is or includes, for example, a single-core or multi-core hardware processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 402 uses an instruction set architecture such as x46 or Advanced RISC Machine (Arm).

In some embodiments, each or any of the memory devices 404 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 402). Memory devices 404 are examples of non-volatile computer-readable storage media.

In some embodiments, each or any of the network interface devices 406 includes one or more circuits (such as a baseband processor and/or a wired or wireless transceiver), and implements layer one, layer two, and/or higher layers for one or more wired communications technologies (such as Ethernet (IEEE 402.3)) and/or wireless communications technologies (such as Bluetooth, WiFi (IEEE 402.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all the circuitry in the housing to perform transmission and reception. In some embodiments, the transmitter and receiver of a transceiver may not share any common circuitry and/or may be in the same or separate housings.

In some embodiments, each or any of the display interfaces 404 is or includes one or more circuits that receive data from the hardware processors 402, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 412, which displays the image data. Alternatively or additionally, in some embodiments, each or any of the display interfaces 404 is or includes, for example, a video card, video adapter, or graphics processing unit (GPU).

In some embodiments, each or any of the user input adapters 410 is or includes one or more circuits that receive and process user input data from one or more user input devices (not shown in FIG. 4) that are included in, attached to, or otherwise in communication with the computing device 400, and that output data based on the received input data to the hardware processors 402. Alternatively or additionally, in some embodiments each or any of the user input adapters 410 is or includes, for example, a PS/2 interface, a USB interface, a touchscreen controller, or the like; and/or the user input adapters 410 facilitates input from user input devices (not shown in FIG. 4) such as, for example, a keyboard, mouse, trackpad, touchscreen, etc.

In some embodiments, the display device 412 may be a Liquid Crystal Display (LCD) display, Light Emitting Diode (LED) display, or other type of display device. In embodiments where the display device 412 is a component of the computing device 400 (e.g., the computing device and the display device are included in a unified housing), the display device 412 may be a touchscreen display or non-touchscreen display. In embodiments where the display device 48rch connected to the computing device 400 (e.g., is external to the computing device 400 and communicates with the computing device 400 via a wire and/or via wireless communication technology), the display device 412 is, for example, an external monitor, projector, television, display screen, etc.

In various embodiments, the computing device 400 includes one, or two, or three, four, or more of each or any of the above-mentioned elements (e.g., the hardware processors 402, memory devices 404, network interface devices 406, display interfaces 404, and user input adapters 410). Alternatively or additionally, in some embodiments, the computing device 400 includes one or more of: a processing system that includes the hardware processors 402; a memory or storage system that includes the memory devices 404; and a network interface system that includes the network interface devices 406.

The computing device 400 may be arranged, in various embodiments, in many different ways. In various embodiments, the computing device 400 includes one, or two, or three, four, or more of each or any of the above-mentioned elements (e.g., the processors 402, memory devices 404, network interface devices 406, display interfaces 404, and user input adapters 410). Alternatively, or additionally, in some embodiments, the computing device 400 includes one or more of: a processing system that includes the processors 402; a memory or storage system that includes the memory devices 404; and a network interface system that includes the network interface devices 406. Alternatively, or additionally, in some embodiments, the computing device 400 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 402 and the network interface devices 406; or the single SoC (or the multiple SoCs) may include the processors 402, the network interface devices 406, and the memory devices 404; and so on. Further, the computing device 400 may be arranged in some embodiments such that: the processors 402 include a multi- (or single)-core processor; the network interface devices 406 include a first short-range network interface device (which implements, for example, WiFi, Bluetooth, NFC, etc.) and a second long-range network interface device that implements one or more cellular communication technologies (e.g., 3G, 4G LTE, CDMA, etc.); and the memory devices 404 include a RAM and a flash memory. As another example, the computing device 400 may be arranged in some embodiments such that: the processors 402 include two, three, four, five, or more multi-core processors; the network interface devices 406 include a first network interface device that implements Ethernet and a second network interface device that implements WiFi and/or Bluetooth; and the memory devices 404 include a RAM and a flash memory or hard disk.

As previously noted, whenever it is described in this document that a software-based node, module, or process performs an action, operation, or function, the action, operation, or function is in actuality performed by underlying hardware elements according to the instructions used to implement the node, module, or process. Consistent with the foregoing, in various embodiments, each or any combination of the primary MPC nodes 110a, 120a, 130a, primary MPC client 140a, primary MPC Controller 146a, primary blockchain service 147a, and primary frontend module 164a, and each or any combination of the backup MPC nodes 110b, 120b, 130b, backup MPC client 140b, backup primary MPC Controller 146b, backup blockchain service 147b, and backup frontend module 164b, (each of which will be referred to individually for clarity as a "component" for the remainder of this paragraph), is implemented using one or more computing devices 400 of FIG. 4. In such embodiments, the following applies for each component: (a) the elements of the 400 computing device 400 shown in FIG. 4 (i.e., the one or more hardware processors 402, one or more memory devices 404, one or more network interface devices 406, one or more display interfaces 404, and one or more user input adapters 410), or appropriate combinations or subsets of the foregoing) are configured to, adapted to, and/or programmed to implement each or any combination of the actions, activities, or features described herein as performed by the component and/or by any software nodes, processes, or modules described herein as included within the component; (b) alternatively or additionally, to the extent it is described herein that one or more software nodes, processes, or modules exist within the component, in some embodiments, such software nodes, processes, or modules (as well as any data described herein as handled and/or used by the software nodes, processes, or modules) are stored in the memory devices 404 (e.g., in various embodiments, in a volatile memory device such as a RAM or an instruction register and/or in a non-volatile memory device such as a flash memory or hard disk) and all actions described herein as performed by the software nodes, processes, or modules are performed by the processors 402 in conjunction with, as appropriate, the other elements in and/or connected to the computing device 400 (i.e., the network interface devices 406, display interfaces 404, user input adapters 410, and/or display device 412); (c) alternatively or additionally, to the extent it is described herein that the component processes and/or otherwise handles data, in some embodiments, such data is stored in the memory devices 404 (e.g., in some embodiments, in a volatile memory device such as a RAM and/or in a non-volatile memory device such as a flash memory or hard disk) and/or is processed/handled by the processors 402 in conjunction, as appropriate, the other elements in and/or connected to the computing device 400 (i.e., the network interface devices 406, display interfaces 404, user input adapters 410, and/or display device 412); (d) alternatively or additionally, in some embodiments, the memory devices 402 store instructions that, when executed by the processors 402, cause the processors 402 to perform, in conjunction with, as appropriate, the other elements in and/or connected to the computing device 400 (i.e., the memory devices 404, network interface devices 406, display interfaces 404, user input adapters 410, and/or display device 412), each or any combination of actions described herein as performed by the component and/or by any software nodes, processes, or modules described herein as included within the component.

Consistent with the techniques described herein, as one example, in an embodiment where multiple instances of the computing device 400 are used to implement the digital asset custody system 100, the memory devices 404 could load program instructions for the functionality of the modules, operations, and/or function blocks described above.

The hardware configurations shown in FIG. 4 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 4, (e) via other hardware arrangements, architectures, and configurations, and/or via combinations of the technology described in (a) through (e).

7. Technical Advantages of Described Subject Matter

The following paragraphs describe technical advantages that may be realized in accordance with various embodiments discussed herein.

In some embodiments, the digital asset custody system includes a primary asset custody subsystem in a first cloud computing data center and a backup asset custody subsystem in a second cloud computing data center different from the first cloud computing data center. The primary asset custody subsystem includes a plurality of primary multi-party computation (MPC) clusters, where each primary MPC cluster is allocated to an asset owner and includes a primary MPC controller, a primary MPC client, and a plurality of primary MPC nodes, and where each primary MPC node in the primary MPC cluster is configured to operate in a different computing environment. The backup asset custody subsystem includes a plurality of backup MPC clusters corresponding to the plurality of primary MPC clusters, where each backup MPC cluster is allocated to the asset owner of its corresponding primary MPC cluster and includes a backup MPC controller, a backup MPC client, and a plurality of backup MPC nodes, and where each backup MPC node in the backup MPC cluster is configured to operate in a different computing environment. This digital asset custody system architecture, along with separable aspects/features thereof, addresses a number of technical problems and embodies a number of technical advantages, including but not limited to with respect to digital asset custody system reliability and information security, as will be described below.

One technical challenge present in the context of digital asset custody systems is system reliability, where the primary digital asset custody subsystem becomes less than fully operational and/or is unreliable because of one or more failures, abnormalities, and other conditions that render the primary digital asset custody subsystem less than fully operational. That technical challenge is met by the described digital asset custody system via the use of one or more backup digital asset custody subsystems to take over the functions of the primary digital asset custody subsystem as described herein, where private key shares are replicated from the primary digital asset custody subsystem to the backup digital asset custody subsystem. Because the private key shares are replicated to the backup digital asset custody subsystem, the backup digital asset custody system can perform functions/operations (such as the generation (including signing) of digital asset transactions) when it is switched over to.

Replicating private key shares from the primary MPC nodes to corresponding backup MPC nodes potentially exposes the private key shares to unauthorized access, discovery, and/or theft. Thus, another technical challenge present in the context of a failsafe digital asset custody system how to protect against unauthorized access to/theft of secrets and/or other valuable information like private key shares held in the primary digital asset custody subsystem that are replicated in the backup digital asset custody subsystem.

In some embodiments, this technical challenge is met by the backup MPC client for the backup MPC cluster obtaining and sending a backup MPC node export public key (that is paired with a "export" private key) from each of the backup MPC nodes in the backup MPC cluster to the primary MPC client. The primary MPC client sends information in one or more data messages including each of the export public keys to a corresponding primary MPC node in the primary MPC cluster, and in response, receives one or more data messages from each primary MPC node in the primary MPC cluster including a corresponding encrypted private key share encrypted with a corresponding export public key. The primary MPC client sends the encrypted private key shares to the backup MPC client over a secure VPC peering connection, and the backup MPC client sends the encrypted private key shares in one or more data messages to corresponding backup MPC nodes in the backup MPC cluster. Encrypting and communicating the private key shares in this manner protects them against access and/or discovery; additionally, the use of the secure VPC peering connection doubly protects them.

In some embodiments, each of the backup MPC nodes in the backup MPC cluster decrypts a corresponding encrypted private key share using its export private key in the export public key-export private key pair to obtain a corresponding backup private key share that can be stored in a secure database for the MPC node. In addition, before storing, the backup private key share may be encrypted. The encryption and the storage in a secure database further protect the replicated private key shares in the backup digital asset custody subsystem from access and/or discovery.

In some embodiments, after decrypting its corresponding encrypted private key share from the primary digital asset custody subsystem, each of the backup MPC nodes in the backup MPC cluster may, in some example embodiments, generate a new backup private key share based on its corresponding backup private key share (key share re-generation). The new backup private key shares may be used by the backup client to generate partial digital signatures which are combined to provide a valid signature. Thus, even if an encrypted private key share initially sent from the primary digital asset custody system could be intercepted or accessed, and even if after such intercepting or accessing, the encrypted private key share could be decrypted by an unauthorized party, the resulting (decrypted) private key share would not match the new backup private key share. This key re-generation process further enhances the security of and protects the secrecy of the primary and backup private key shares. To further secure the new backup private key share, in some embodiments, the new backup private key share is encrypted and stored in a secure database for the backup MPC node.

Further, other technical problems may be addressed by, and/or other technical advantages may be embodied in, the subject matter described herein.

8. Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

9. Additional Applications of Described Subject Matter

Although a single backup asset custody subsystem 104*b* is shown in in the digital asset custody system 100 of FIG. 1 and described for convenience above, more than one backup asset custody subsystem may be configured and deployed, and private key shares replicated therein as described above in order to provide further redundancy and reliability of the digital asset custody system 100. While it is described herein that an MPC cluster in the digital asset custody system 100 may include three MPC nodes, it should be understood that three is just an example number of MPC nodes that may be included in a cluster, and that in various embodiments a different number of nodes (e.g., two, or four, or five, or six, or more) may be employed; in some such embodiments, the architecture of the digital asset custody system 100 may include less/additional signing party environments (to maintain the 1:1 ratio between MPC nodes and signing party environments), and the processes described herein may operate essentially as shown/described herein, differing to involve the different number of nodes.

The subject matter described herein may be applied in different domains, in addition to the domain of digital assets. For example, the subject matter described herein may be applied in any domain that requires secure custody and/or secure access of digital information and/or objects.

Although process steps, algorithms or the like, including without limitation with reference to FIGS. 1-4, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system comprising:
   one or more hardware processors;
   one or more memories in communication with the one or more hardware processors; wherein:
   the one or more hardware processors and the one or more memories are configured to implement a primary asset custody subsystem in a first cloud computing data center and a backup asset custody subsystem in a second cloud computing data center different from the first cloud computing data center;
   the primary asset custody subsystem includes a plurality of primary multi-party computation (MPC) clusters, where each primary MPC cluster is allocated to an asset owner and includes a primary MPC client and a plurality of primary MPC nodes, and where each primary MPC node in the primary MPC cluster is configured to operate in a different signing party computing environment;
   the backup asset custody subsystem includes a plurality of backup MPC clusters corresponding to the plurality of primary MPC clusters, where each backup MPC cluster is allocated to the asset owner of its corresponding primary MPC cluster and includes a backup MPC client and a plurality of backup MPC nodes, and where each backup MPC node in the backup MPC cluster is configured to operate in a different signing party computing environment;
   each primary MPC node in the primary MPC cluster is configured to generate a private key share for a partial signature for a blockchain transaction;
   the backup MPC client is configured to send an export public key from each backup MPC node in the backup MPC cluster to the primary MPC client, where each export public key is part of a corresponding export public key-export private key pair;
   the primary MPC client is configured to:
   send each of the export public keys to a corresponding primary MPC node in the primary MPC cluster, and in response, receive from each primary MPC node in the primary MPC cluster a corresponding encrypted private key share encrypted with a corresponding export public key; and
   send the encrypted private key shares to the backup MPC client;
   the backup MPC client is configured to transmit the encrypted private key shares to corresponding backup MPC nodes in the backup MPC cluster; and
   each backup MPC node in the backup MPC cluster is configured to decrypt a corresponding encrypted private key share using the export private key from the corresponding export public key-export private key pair to obtain a decrypted corresponding backup private key share, and to store the decrypted corresponding backup private key share.

2. The system in claim 1, wherein each backup MPC node in the backup MPC cluster is configured to encrypt its corresponding backup private key share using an encryption protocol associated with the backup MPC node and to store the encrypted backup private key share in memory.

3. The system in claim 1, wherein in response to the backup asset custody subsystem being activated for operation, the backup MPC client in the backup MPC cluster is configured to generate a full signature for a blockchain transaction for an asset owner associated with the backup MPC cluster using backup partial signatures generated using the backup private key shares from each backup MPC node in the backup MPC cluster.

4. The system in claim 1, wherein each backup MPC node in the backup MPC cluster is configured to generate a new backup private key share different from and to replace its corresponding backup private key share.

5. The system in claim 4, wherein each backup MPC node in the backup MPC cluster is configured to encrypt the new backup private key share and store the new backup private key share in a database for the backup MPC node.

6. The system in claim 4, wherein in response to the backup asset custody subsystem being activated for operation, the backup MPC client in the backup MPC cluster is configured to generate a full signature for a blockchain transaction for an asset owner associated with the backup MPC cluster using backup partial signatures generated using the new backup private key shares from each backup MPC node in the backup MPC cluster.

7. The system in claim 4, wherein each primary MPC node in the primary MPC cluster is configured to generate and store in a database for the primary MPC node a new primary private key share different from and to replace its corresponding private key share, and wherein the new primary private key share is different from the new backup private key share for the corresponding backup MPC node.

8. The system in claim 7, wherein each primary MPC node in the primary MPC cluster is configured to encrypt the new primary private key share and store the encrypted new primary private key share in a database for the primary MPC node.

9. The system in claim 7, wherein the primary MPC client is configured to generate a full signature for a blockchain transaction for an asset owner associated with the primary MPC cluster using primary partial signatures generated using the new primary private key shares from each primary MPC node in the primary MPC cluster.

10. The system in claim 1, wherein the primary MPC client is configured to communicate with each primary MPC node in the primary MPC cluster, using one or more MPC protocols, to generate a public blockchain address for an asset owner associated with the primary MPC cluster, and wherein the backup MPC client is configured to communicate with each backup MPC node in the backup MPC cluster, using one or more MPC protocols, to generate a public blockchain address for an asset owner associated with the backup MPC cluster.

11. The system in claim 1, wherein the backup MPC client is configured to request the export public key from each backup MPC node in the backup MPC cluster, and in response, each backup MPC node is configured to generate its export public key from the export private key in the corresponding export public key-export private key pair and send the export public key to the backup MPC client.

12. The system in claim 1, wherein the first cloud computing data center is located in a first geographic location that is remote and different from a second geographic location where the second cloud computing data center is located, and wherein each of the primary MPC client and the backup MPC client is each configured to establish a secure communications link permitting secure communications between the primary asset custody subsystem in the first cloud computing data center and the backup asset custody subsystem in the second cloud computing data center.

13. The system in claim 12, wherein the secure communications link is a virtual private cloud (VPC) peering connection configured to securely route data packets between the primary MPC client and the backup MPC client using private IP addresses.

14. The system in claim 13, wherein each backup MPC cluster is configured with virtual private communication links between the different signing party computing environments associated with each backup MPC node in the backup MPC cluster.

15. The system in claim 1, further comprising an additional backup asset custody subsystem in a third cloud computing data center different from the first and second cloud computing data centers.

16. A method, comprising:

in a computing system that includes one or more hardware processors and one or more memories that implement a primary asset custody subsystem in a first cloud computing data center and a backup asset custody subsystem in a second cloud computing data center different from the first cloud computing data center, the primary asset custody subsystem including a plurality of primary multi-party computation (MPC) clusters, where each primary MPC cluster is allocated to an asset owner and includes a primary MPC client and a plurality of primary MPC nodes, the backup asset custody subsystem including a plurality of backup MPC clusters corresponding to the plurality of primary MPC clusters, where each backup MPC cluster is allocated to the asset owner of its corresponding primary MPC cluster and includes a backup MPC client and a plurality of backup MPC nodes, wherein the one or more memories are configured to store instructions, which when executed by the one or more hardware processors cause the one or more hardware processors to perform operations comprising:

operating each primary MPC node in the primary MPC cluster in a different computing signing party environment and generating a private key share for a partial signature for a blockchain transaction;

operating each backup MPC node in the backup MPC cluster operate in a different computing signing party environment;

the backup MPC client sending an export public key from each backup MPC node in the backup MPC cluster to the primary MPC client, where each export public key is part of a corresponding export public key-export private key pair;

the primary MPC client:

sending each export public key to a corresponding primary MPC node in the primary MPC cluster, and in response, receiving from each primary MPC node in the primary MPC cluster a corresponding encrypted private key share encrypted with a corresponding export public key; and sending the encrypted private key shares to the backup MPC client;

the backup MPC client transmitting the encrypted private key shares to corresponding backup MPC nodes in the backup MPC cluster; and each backup MPC node in the backup MPC cluster decrypting a corresponding encrypted private key share using the export private key from the corresponding export public key-export private key pair to obtain a corresponding backup private key share, and to store the decrypted corresponding backup private key share.

17. The method in claim 16, further comprising:

each backup MPC node in the backup MPC cluster encrypting its corresponding backup private key share using an encryption protocol associated with the backup MPC node, and storing the encrypted backup private key share in memory.

18. The method in claim 16, further comprising:

in response to the backup asset custody subsystem being activated for operation, the backup MPC client in the backup MPC cluster generating a full signature for a blockchain transaction for an asset owner associated with the backup MPC cluster using backup partial signatures generated using the backup private key shares from each backup MPC node in the backup MPC cluster.

19. The method in claim 16, further comprising each backup MPC node in the backup MPC cluster:

generating a new backup private key share different from its corresponding backup private key share, and replacing the backup private key share with the new backup private key share.

20. A non-transitory, computer-readable storage medium for a computing system that includes one or more hardware processors and one or more memories that implement a primary asset custody subsystem in a first cloud computing data center and a backup asset custody subsystem in a second cloud computing data center different from the first cloud computing data center, the primary asset custody subsystem including a plurality of primary multi-party computation (MPC) clusters, where each primary MPC cluster is allocated to an asset owner and includes a primary MPC client and a plurality of primary MPC nodes, the backup asset custody subsystem including a plurality of backup MPC clusters corresponding to the plurality of primary MPC clusters, where each backup MPC cluster is allocated to the asset owner of its corresponding primary MPC cluster and includes a backup MPC client and a plurality of backup MPC nodes, wherein the one or more memories are configured to store instructions, which when executed by the one or more hardware processors cause the one or more hardware processors to perform operations comprising:

operating each primary MPC node in the primary MPC cluster in a different computing signing party environment to generate a private key share for a partial signature for a blockchain transaction;

wherein the one or more memories are configured to store instructions for the backup asset custody subsystem which includes a plurality of backup MPC clusters corresponding to the plurality of primary MPC clusters, where each backup MPC cluster is allocated to the asset owner of its corresponding primary MPC cluster and includes a backup MPC client and a plurality of backup MPC nodes, operating each backup MPC node in the backup MPC cluster operate in a different computing signing party environment;

the backup MPC client sending an export public key from each backup MPC node in the backup MPC cluster to the primary MPC client, where each export public key is part of a corresponding export public key-export private key pair;

the primary MPC client:

sending each export public key to a corresponding primary MPC node in the primary MPC cluster, and in response, receiving from each primary MPC node in the primary MPC cluster a corresponding encrypted private key share encrypted with a corresponding export public key; and sending the encrypted private key shares to the backup MPC client;

the backup MPC client transmitting the encrypted private key shares to corresponding backup MPC nodes in the backup MPC cluster; and each backup MPC node in the backup MPC cluster decrypting a corresponding encrypted private key share using the export private key from the corresponding export public key-export private key pair to obtain a corresponding backup private key share, and to store the decrypted corresponding backup private key share.

* * * * *